US009521210B2

(12) United States Patent
Taylor et al.

(10) Patent No.: US 9,521,210 B2
(45) Date of Patent: Dec. 13, 2016

(54) METHODS AND APPARATUS TO INSTALL VOICE OVER INTERNET PROTOCOL (VOIP) DEVICES

(75) Inventors: Michael Jason Taylor, Leander, TX (US); James Edward Zeigler, Jr., Austin, TX (US); Lakshminarashimhan Naidu, Pearland, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2396 days.

(21) Appl. No.: 11/539,536

(22) Filed: Oct. 6, 2006

(65) Prior Publication Data

US 2008/0084870 A1    Apr. 10, 2008

(51) Int. Cl.
*H04L 12/66* (2006.01)
*H04L 29/08* (2006.01)
*H04W 4/22* (2009.01)
*H04W 76/00* (2009.01)
*H04W 4/02* (2009.01)
*H04L 29/06* (2006.01)

(52) U.S. Cl.
CPC ............ *H04L 67/306* (2013.01); *H04L 63/08* (2013.01); *H04L 67/34* (2013.01); *H04W 4/02* (2013.01); *H04W 4/22* (2013.01); *H04W 76/007* (2013.01); *H04M 2242/30* (2013.01)

(58) Field of Classification Search
CPC ...... H04W 12/06; H04W 12/08; H04W 28/18; H04W 36/0033; H04W 8/18; H04W 8/04; H04W 76/02; H04W 4/22; H04W 76/007; H04W 4/02; H04W 64/00; H04W 64/003; H04L 61/2007; H04L 67/28; H04L 41/0806; H04M 2242/04; H04M 3/5116; H04M 11/04; H04M 2242/30; H04M 1/72536; H04M 1/72572; H04M 3/42
USPC .................................. 370/352–356
See application file for complete search history.

(56) References Cited

U.S. PATENT DOCUMENTS

| 6,745,235 B2 | 6/2004 | Baca et al. |
| 6,760,762 B2 | 7/2004 | Pezzutti |
| 6,842,449 B2 | 1/2005 | Hardjono |
| 6,865,681 B2 | 3/2005 | Nuutinen |
| 6,891,941 B1 | 5/2005 | Barthel et al. |
| 2002/0057678 A1 | 5/2002 | Jiang et al. |

(Continued)

FOREIGN PATENT DOCUMENTS

| WO | 0223851 | 3/2002 |
| WO | 2006001647 | 1/2006 |

OTHER PUBLICATIONS

Patent Cooperation Treaty, International Search Report and Written Opinion of International Searching Authority for PCT/US2007/075578, Jan. 24, 2008, 11 pages.

(Continued)

*Primary Examiner* — Melanie Jagannathan
*Assistant Examiner* — Najeebuddin Ansari
(74) *Attorney, Agent, or Firm* — Hanley, Flight & Zimmerman, LLC

(57) ABSTRACT

Methods and apparatus to install voice over Internet Protocol (VoIP) devices are disclosed. An example method comprises receiving a device identifier and an authentication credential from a voice over Internet protocol (VoIP) device, and provisioning the device identifier to a subscriber account based on the authentication credential.

28 Claims, 11 Drawing Sheets

(56) References Cited

U.S. PATENT DOCUMENTS

| | | | |
|---|---|---|---|
| 2003/0135595 A1* | 7/2003 | Segelstein | 709/223 |
| 2003/0206546 A1 | 11/2003 | Beyda | |
| 2004/0102182 A1* | 5/2004 | Reith et al. | 455/410 |
| 2004/0137890 A1* | 7/2004 | Kalke | G06Q 30/012 455/418 |
| 2004/0242209 A1* | 12/2004 | Kruis | H04W 4/001 455/414.1 |
| 2005/0018620 A1 | 1/2005 | Berndt et al. | |
| 2005/0063519 A1* | 3/2005 | James | 379/45 |
| 2005/0141528 A1* | 6/2005 | Matsuhashi et al. | 370/401 |
| 2005/0202799 A1* | 9/2005 | Rollender | H04W 76/007 455/404.1 |
| 2005/0220295 A1 | 10/2005 | Koikeda | |
| 2006/0153342 A1* | 7/2006 | Sasaki | H04M 3/5116 379/37 |
| 2006/0168162 A1* | 7/2006 | Woundy | 709/220 |
| 2006/0221940 A1* | 10/2006 | Ong et al. | 370/352 |
| 2007/0008893 A1* | 1/2007 | Singh et al. | 370/241 |
| 2007/0258440 A1* | 11/2007 | Watanabe | 370/352 |
| 2007/0291927 A1* | 12/2007 | Batni et al. | 379/372 |
| 2007/0293216 A1* | 12/2007 | Jiang | 455/433 |
| 2008/0013523 A1* | 1/2008 | Nambakkam | H04M 7/0075 370/352 |
| 2008/0013696 A1* | 1/2008 | Motley | H04M 3/42263 379/45 |
| 2008/0046735 A1* | 2/2008 | Nedeltchev et al. | 713/173 |
| 2008/0194225 A1* | 8/2008 | Tischer | H04L 12/66 455/404.2 |
| 2008/0235770 A1* | 9/2008 | Miao | 726/4 |
| 2009/0158032 A1* | 6/2009 | Costa et al. | 713/156 |

OTHER PUBLICATIONS

International Bureau, International Preliminary Report on Patentability for PCT/US2007/075578, mailed Apr. 16, 2009, 7 pages.

* cited by examiner

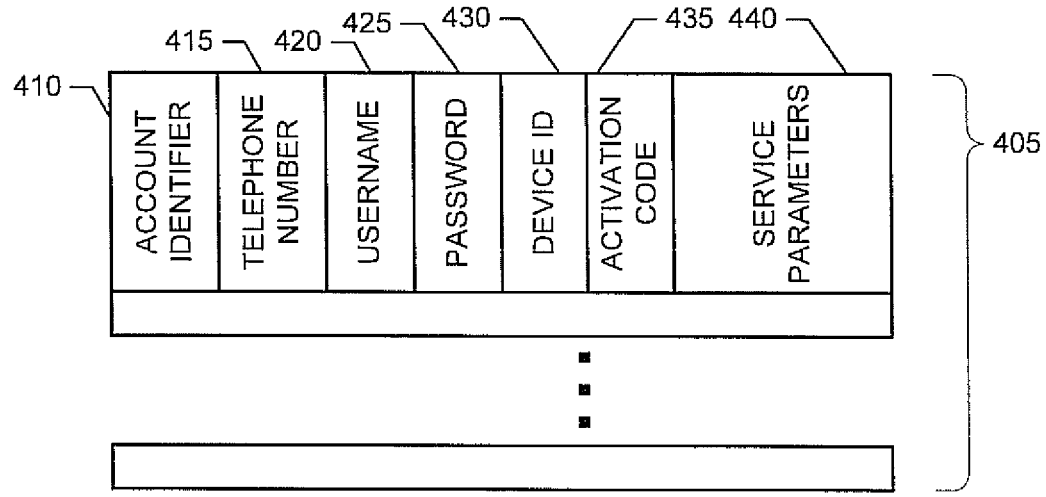
FIG. 4
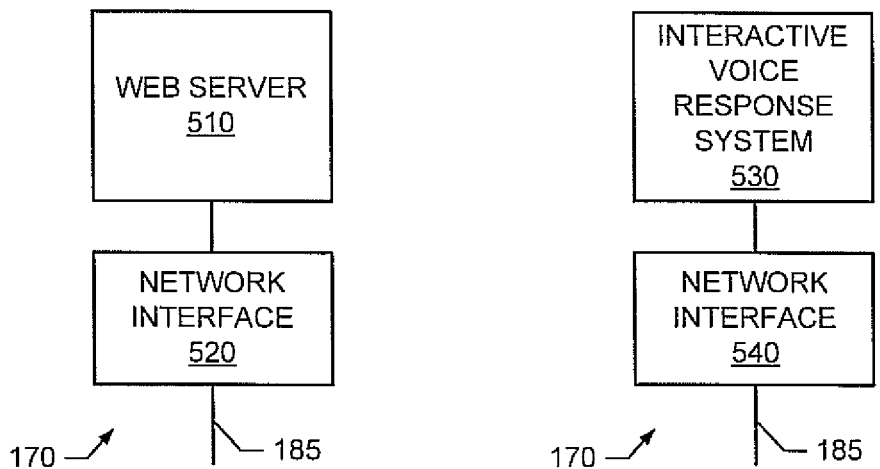
FIG. 5A  FIG. 5B
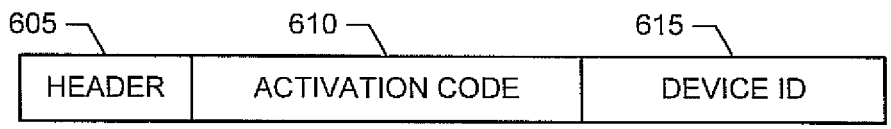
FIG. 6A
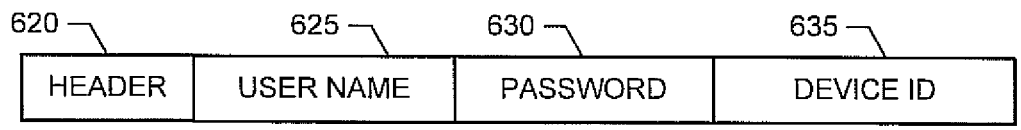
FIG. 6B

METHODS AND APPARATUS TO INSTALL VOICE OVER INTERNET PROTOCOL (VOIP) DEVICES

FIELD OF THE DISCLOSURE

This disclosure relates generally to communication networks and, more particularly, to methods and apparatus to install voice over Internet Protocol (VoIP) devices.

BACKGROUND

Today, the installation and/or provisioning of voice over Internet Protocol (VoIP) devices may be costly, complex and/or multi-phased. In some examples, a skilled technician is required to perform onsite installation including the relaying of subscriber-to-device information back to a provisioning center. In other examples, a skilled technician is required to match a VoIP device to a particular customer before the VoIP device is shipped to the customer for installation.

BRIEF DESCRIPTION OF THE DRAWINGS

FIG. 4 illustrates an example data structure used to implement the example subscriber account database of FIG. 3.

FIGS. 5A and 5B illustrate example manners of implementing any of the example device authentication servers of FIGS. 1 and/or 3.

FIGS. 6A and 6B illustrate example authentication information data structures.

DETAILED DESCRIPTION

Figure 1:
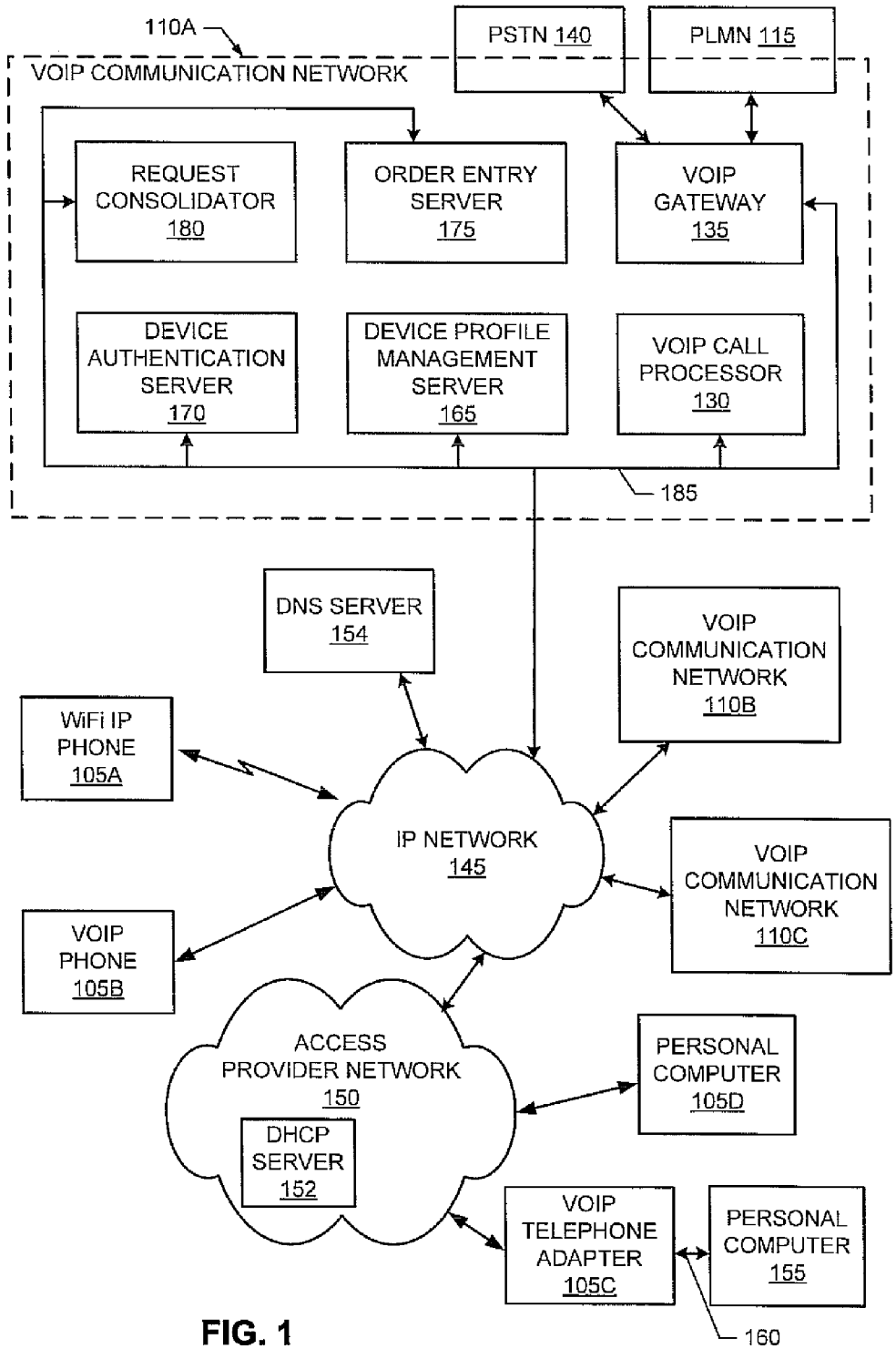
FIG. 1 is a schematic illustration of an example voice over Internet protocol (VoIP) communication system constructed in accordance with the teachings of the invention.

FIG. 1 is a schematic illustration of an example voice over Internet protocol (VoIP) communication system constructed in accordance with the teaching of the invention. In the interest of brevity and clarity, throughout the following disclosure references will be made to installing VoIP devices associated with the example VoIP communication system of FIG. 1, VoIP networks, VoIP devices and/or VoIP services. However, it should be understood that the methods and apparatus to install and/or provision the devices described herein are applicable to other types and/or varieties of communication services, networks, technologies and/or systems such as public switched telephone network (PSTN) systems, wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or combinations and/or hybrids of these devices, systems and/or networks.

To allow users to, for example, place and/or receive a VoIP based telephone call, the example communication system of FIG. 1 includes one or more VoIP devices, four of which are illustrated in FIG. 1 with reference numerals 105A, 105B, 105C and 105D. The example VoIP devices 105A-D of FIG. 1 may each be any one of a variety of VoIP devices including, for example, any wireless VoIP device 105A (e.g., a wireless-fidelity (a.k.a. WiFi) Internet protocol (IP) phone), any corded and/or cordless VoIP phone 105B, any VoIP adapter 105C (e.g., an analog telephone adapter (ATA)), any VoIP enabled personal computer (PC) 105D, any VoIP endpoint, and/or any VoIP residential gateway. While four example VoIP devices 105A-D are illustrated in FIG. 1, persons of ordinary skill in the art will readily appreciate that the VoIP communication system of FIG. 1 may include any number and/or variety of VoIP devices. An example manner of implementing any of the example VoIP devices 105A-D is discussed in connection with FIG. 2.

To provide VoIP communication services, the example system of FIG. 1 includes any of a variety VoIP communication networks, three of which are illustrated in FIG. 1 with reference numerals 110A, 110B and 110C. Some example VoIP communication networks 110A-C are implemented in accordance with one or more past, current and/or present future $3^{rd}$ Generation Partnership Program (3GPP) Internet Multimedia Subsystem (IMS) standard(s) and/or specification(s). Generally, each of the VoIP networks 110A-C is associated with a different VoIP service provider; however, they need not be so associated. While three VoIP networks 110A-C are illustrated in FIG. 1, persons of ordinary skill in the art will readily appreciate that the communication system of FIG. 1 may include any number and/or variety of VoIP communication networks operated by any number of VoIP service providers. Moreover, while only the example VoIP network 110A is illustrated in more detail in FIG. 1, persons of ordinary skill in the art will readily appreciate that the example VoIP networks 110B and 110C may have a similar implementation. However, the VoIP networks 110A-C need not utilize an identical implementation to that shown in conjunction with the example VoIP network 110A, and may differ in any of a variety of insignificant and/or significant ways. For example, while the example VoIP network 110A of FIG. 1 includes communicative coupling to a public land-mobile network (PLMN) (e.g., a cellular network) 115, the example VoIP networks 110B-C need not include such a coupling. Moreover, the number of VoIP call processors, etc. included in each of the VoIP networks 110A-C need not be the same.

Further, while the example VoIP network 110A of FIG. 1 includes a device profile management server 165 and a device authentication server 170, the example VoIP networks 110B-C can perform device profile management and/or authentication using any variety of similar, alternative and/or additional method(s), server(s) and/or device(s). However, the VoIP networks 110A-C may perform device profile management and/or authentication using substantially similar method(s), server(s) and/or device(s) as those described herein for the example VoIP network 110A.

To initiate, receive, establish, complete and/or route any of a variety of VoIP communication sessions and/or VoIP telephone calls with, to and/or between the example VoIP devices 105A-C and/or 105D, the example VoIP communication network 110A of FIG. 1 may communicate with and/or contain any portion of any of a variety of VoIP call processor(s) 130 and/or VoIP gateway(s) 135. As illustrated in FIG. 1, the example VoIP communication network 110A may also include an interface to and/or contain a portion of the PLMN 115, an interface to and/or contain a portion of a public switched telephone network (PSTN) 140, and/or an interface to and/or contain a portion of any of a variety of additional communication networks. For example, using any of a variety of technique(s), method(s), protocol(s) and/or technology(-ies), the VoIP call processor 130, the VoIP gateway 135 and the PSTN 140 can facilitate telephone calls between a PSTN-based phone (not shown) and any of the example VoIP devices 105A-D.

In the illustrated example of FIG. 1, the VoIP gateway 135 may be and/or may implement, for example, a media gateway control function (MGCF). While in the example of FIG. 1, the gateway 135 is implemented by and/or within the example VoIP communication network 110A, the example VoIP gateway 135 may be associated with the VoIP communication network 110A, the PLMN 115, the PSTN 140 and/or any other communication network.

The example PLMN 115 and/or the example PSTN 140 of FIG. 1 may be implemented by any variety of communication device(s), switch(es), protocol(s), system(s) and/or technology(-ies). For instance, the example PLMN 115 may include one or more cellular base stations that can transmit cellular signals to and/or receive cellular signals from a cellular communication device (not shown) using any variety of protocols (e.g., time-divisional multiple access (TDMA), code-divisional multiple access (CDMA), etc.).

In the illustrated example of FIG. 1, the example VoIP devices 105A-D are communicatively coupled to the example VoIP communication networks 110A-C via any variety of public and/or private IP networks 145, such as the Internet. However, any variety of current and/or future communication network(s), communication system(s), communication device(s), transmission medium(s), protocol(s), technique(s) and/or standard(s) could be used to communicatively couple the VoIP devices 105A-D and the VoIP communication networks 110A-C. Interfaces between the VoIP devices 105A-D and the IP network 145, and/or the VoIP communication networks 110A-C and the IP Network 145 may be implemented using any variety of current and/or future device(s), technology(-ies) and/or method(s). For example, the example VoIP devices 105A-C and/or 105D may be coupled to the IP Network 145 via any of a variety of voice-band modem(s), digital subscriber line (DSL) modem(s), cable modem(s), Ethernet transceiver(s), optical transceiver(s), virtual private network (VPN) connection(s), Institute of Electrical and Electronics Engineers (IEEE) 802.11x (a.k.a. WiFi) transceiver(s), IEEE 802.16 (a.k.a. WiMax), access point(s), access provider network(s), etc. Moreover, the example IP Network 145 of FIG. 1 may, in some examples, extend geographically to include a location near to and/or encompassing one or more VoIP devices 105A-D. For example, the IP Network 145 and/or a public and/or private access provider network (e.g., an example access provider network 150) may include a wireless access point (not shown) by which, for example, the example WiFi IP phone 105A connects to the IP Network 145. In other examples, an access provider network includes a DSL access multiplexer (DSLAM) and/or a cable modem headend that facilitates communicative coupling between a subscriber having a DSL modem and/or a cable modem and the IP Network 145. In general, an access provider network 150 provides, implements and/or facilitates a communicative coupling between a VoIP device 105A-D and the IP network 145.

While only a single access provider network 150 is illustrated in FIG. 1, persons of ordinary skill in the art will readily appreciate that the example VoIP communication system of FIG. 1 may contain any number and/or variety of access provider networks. Moreover, a VoIP device 105A-D may connect directly to the IP Network 145 and/or indirectly via any of a variety and/or any number of access provider networks. In some examples, each VoIP device 105A-C connects to the IP Network 145 via an access provider network 150.

To provide IP addresses to devices, the example access provider network 150 of FIG. 1 includes any variety or number of domain host configuration protocol (DHCP) servers 152. The example DHCP server 152 of FIG. 1 implements a protocol and/or set of rules whereby a communication device associated with the access provider network 150 (e.g., the example VoIP devices 105C and 105D) can be assigned and/or obtain a unique IP address. Using any of a variety of protocol(s) and/or message(s), the example DHCP server 152 can additionally implement an information discovery process that may be used by a VoIP device 105C-D to obtain a list of one or more potential VoIP service providers. An example list includes at least one uniform resource locator (URL) for each potential VoIP service provider and/or a single URL that provides information on multiple VoIP service providers. A user of the VoIP device 105C-D can use the URL(s) to find out more information (e.g., price, service terms, coverage, availability, etc.) concerning offered VoIP services. Based upon this service information, the user can, in some examples, select a VoIP service provider, create a subscriber account and/or authenticate the VoIP device 105A-D to an existing subscriber account. While not illustrated in FIG. 1, persons of ordinary skill in the art will readily appreciate that other VoIP devices (e.g. the example VoIP devices 105A and 105B) likewise obtain IP addresses and/or service provider information from a DHCP server associated with the IP network 145 and/or an access provider network 150 by which the VoIP device access the IP network 145.

Additionally or alternatively, a user may employ any of a variety of methods to identify and/or select a VoIP service provider. For example, the user may perform a web-based search to identify and/or obtain information about VoIP service providers. In some examples, the user can provide and/or configure their VoIP device 105A-D with one or more parameters that identify a selected VoIP service provider (e.g., a URL, such as www.att.voip.com, provided by AT&T that allows the VoIP device 105A-D to be authenticated and become associated with and/or provisioned to a subscriber account provided by AT&T).

To resolve identifiers (e.g., URLs) into IP addresses, the example communication system of FIG. 1 includes any of a variety of domain name servers 154. Using any of a variety of method(s), technique(s) and/or protocol(s), the example domain name server (DNS) 154 of FIG. 1 returns an IP address for an identified server (e.g., a URL) to a communication device in response to a query from a communication device. While a single DNS server 154 is illustrated in FIG. 1, persons of ordinary skill in the art will readily recognize that the example communication system of FIG. 1 may include any number of domain name servers situated in any of a variety of locations within the example communication system.

Persons of ordinary skill in the art will also readily appreciate that the access provider network 150, the IP network 145, the VoIP communication networks 110A-C, the PLMN 115 and the PSTN 140 may be owned and/or operated by any number of operators and/or service providers. In some examples, a service provider operates an access provider network, a VoIP service provider network, a PLMN 115 and a PSTN 140. In some other examples, an access service provider operates one or more access provider networks, while a VoIP service provider operates one or more VoIP service provider networks. The example methods and apparatus to install VoIP devices apply to any of a variety of access provider networks 150, IP networks 140, VoIP communication networks 110A-C, PLMNs 115 and/or PSTNs 140 that are owned and/or operated by any combination of service providers and/or operators.

While not illustrated in FIG. 1, persons of ordinary skill in the art will further readily appreciate that the example VoIP devices 105A-C of FIG. 1 may be communicatively coupled to an access provider (e.g., the example access provider network 150) and/or the IP network 145 via any of a variety of public and/or private local area networks (LANs) located within, for example, a residence, school and/or place of business, and/or via any of a variety of router(s), bridge(s) and/or gateway(s) located within and/or a part of such public and/or private locations and/or LANs. For example, the example VoIP telephone adapter 105C is communicatively coupled to a PC 155 via a LAN 160. The example PC 155 of FIG. 1 can be used to, for example, control and/or configure the example VoIP telephone adapter 105C via, for example, a web-based configuration interface provided and/or implemented by the VoIP telephone adapter 105C.

In the illustrated example of FIG. 1, VoIP device profiles are provided to and/or used by the VoIP devices 105A-D to appropriately configure the VoIP devices 105A-D and/or services provided by the VoIP devices 105A-D. Device profiles may be structured and/or arranged using any of a variety of headers, fields, sub-fields. Example data and/or information that may be included in a device profile includes an assigned telephone number, an IP address for a serving VoIP call processor 130, a QoS parameter and/or a maximum allowable transmit bandwidth. When a VoIP device 105A-D is not yet provisioned to a subscriber, the VoIP device 105A-D may be provided a default device profile that includes, for example, an IP address of a default VoIP call processor 130 that allows the VoIP device 105A-D to have limited functionality (e.g., make 911 calls, call customer and/or technical support numbers, etc.). Such a default device profile may, as discussed below in connection with FIGS. 7-9, additionally or alternatively, include an identifier (e.g., a URL, IP address, etc.) of a device authentication server 170 that facilitates the VoIP device 105A-D and/or a user of the VoIP device 105A-D to authenticate the VoIP device 105A-D thereby provisioning the VoIP device 105A-D to the user's subscriber account or, in other words, associating the VoIP device 105A-D with the user's subscriber account.

To provision and/or configure VoIP device profiles for one or more the example VoIP devices 105A-D, the example VoIP communication network 110A of FIG. 1 includes any number of VoIP device profile management servers 165. In general, in one example operating mode, the example VoIP device profile management server 165 of FIG. 1: (a) receives a profile request from a VoIP device 105A-D that includes the VoIP device's device identifier, (b) locates a subscriber's account and associated device profile based on the device identifier, and (c) provides the device profile to the VoIP device 105A-D. If the received device identifier is not associated with a subscriber account, in one example operating mode, the example VoIP device profile management server 165 of FIG. 1: (a) provides a default device profile and/or identifies a server that may be used to authenticate the VoIP device, (b) requests and/or receives at least one authentication credential from and/or via the VoIP device 105A-D, and (c) uses the authentication credential to associate the VoIP device 105A-D with the correct subscriber account (i.e., authenticates the VoIP device 105A-D). An example manner of implementing the example VoIP device profile management server 165 is described in connection with FIGS. 3, 4, 5A and 5B. Example scenarios for providing device profiles and/or authenticating VoIP devices 105A-D as part of a VoIP device 105A-D installation are described below in connection with FIGS. 7, 8 and 9.

To authenticate a VoIP device 105A-D, the example VoIP communication network 110A of FIG. 1 includes any number of device authentication servers 170. The device authentication server 170 of FIG. 1 authenticates a VoIP device 105A-D based on one or more subscriber authentication credentials received from and/or via a VoIP device 105A-D. In some examples, the device authentication server 170 receives such authentication credentials via the device profile management server 165. In some other examples, the device authentication server 170 receives the credentials directly via VoIP devices 105A-D. In further examples, the device authentication server 170 receives credentials via neither the device profile management server 165 nor a VoIP device 105A-D (e.g., via a PSTN phone, a general-purpose web-browser). The example device authentication server 170 of FIG. 1 may also receive authentication credentials via any combination of the methods described above.

An example device authentication server 170 is configured to receive an authentication credential as a string of digits received and/or provided by and/or via a VoIP call processor (e.g., the example call processor 130). Such dial digits may be provided in, for example, a header of a VoIP packet. Another example device authentication server 170 is implemented as a VoIP call processor that is configured to allow a VoIP device 105A-D to register using a default device profile and to utilize a string of dialed digits (e.g., an activation code) to authenticate the VoIP device 105A-D. Other example manners of implementing a device authentication server 170 are discussed in connection with FIGS. 5A and 5B.

While the example device profile management server 165 and the example device authentication server 170 are illustrated in FIG. 1 as separate devices and/or servers, they need not be separate. For example, the device profile management server 165 may include and/or incorporate any number and/or variety of device authentication servers 170 as discussed below in connection with FIG. 3. Moreover, a device profile management server 165 may include and/or incorporate one or more device authentication servers 170 while also interacting with one or more additional separate device authentication servers 170.

To configure new and/or re-configure existing subscriber accounts, the example VoIP communication network 110A of FIG. 1 includes an order entry server 175. The example order entry server 175 of FIG. 1 allows a customer service representative, a technician, a subscriber, etc. to establish, remove and/or modify subscriber accounts. The order entry server 175 may include and/or implement, for example, a web-based server that provides any of a variety of web-based interfaces to establish, remove and/or modify subscriber accounts. In some examples, the order entry server 175 provides any of a variety of customized interfaces accessible only to operators, customer service representatives and/or technicians of the VoIP communication network 110A.

When a new subscriber account is created, the example order entry server 175 creates a subscriber account in, for example, a database (e.g., the example subscriber database 305 of FIG. 5) that is, in the illustrated example of FIG. 1, maintained by the device profile management server 165. The example order entry server 175 also sends one or more authentication credentials (e.g., a username, a password, an authentication code, an access code, etc.) that a user of a VoIP device 105A-D will use, provide and/or enter to authenticate the VoIP device 105A-D and thereby associate it with and/or provision it to the user's subscriber account. Likewise, if a subscriber is adding and/or replacing a VoIP device 105A-D to their account, the order entry server 175 can provide and/or send one or more authentication credentials that the user will use to add and/or replace the VoIP device 105A-D, and make corresponding updates and/or changes to the user's subscriber account. The one or more authentication credentials can be sent to the subscriber via, for example, any combination of postal mail, express mail, electronic mail, text message, page, text displayed on a webpage, etc.

To consolidate device profile and/or authentication requests, the example VoIP service provider network 110A of FIG. 1 includes a request consolidator 180. The example request consolidator 180 of FIG. 1 receives and consolidates device profile and/or authentication requests to facilitate the efficient processing of such requests by the device profile management server 165 and/or the device authentication server 170. In some examples having two or more device profile management servers 165 and/or device authentication servers 170, the request consolidator 180 provides a collection point for requests and then distributes them amongst the device profile management servers 165 and/or device authentication servers 170.

The example devices of the example VoIP communication network 110A illustrated in FIG. 1 are communicatively coupled via any variety of communication protocol(s), technology(-ies), network(s), element(s), path(s) and/or devices(s) 185. In some examples, the VoIP call processor 130, the VoIP gateway 135, the device profile management server 165, the device authentication server 170, the order entry server 175, and the request consolidator 180 are communicatively coupled via an Ethernet-based communication network 185 (e.g., in accordance with the IEEE 802.3x family of standards). In other examples, one or more of the VoIP call processor 130, the VoIP gateway 135, the device profile management server 165, the device authentication server 170, the order entry server 175, and/or the request consolidator 180 are communicatively coupled via any variety of specialized and/or customized communication protocol(s) and/or technique(s).

While an example VoIP communication system has been illustrated in FIG. 1, the VoIP communication networks 110A-C, the access provider network 150, devices, servers, systems, gateways, portals, and/or processors illustrated in FIG. 1 may be combined, re-arranged, divided, eliminated and/or implemented in any of a variety of ways. For example, the example device profile management server 165, the example device authentication server 170 and the example request consolidator 180 could be implemented by and/or within a common server. Further, the example VoIP devices 105A-D, the example device profile management server 165, the example device authentication server 170, the example request consolidator 180 and/or, more generally, the example VoIP communication network 110A of FIG. 1 may be implemented by hardware, software, firmware and/or any combination of hardware, software and/or firmware. Moreover, the example VoIP communication system and/or the example VoIP communication network 110A may include additional servers, systems, gateways, portals, and/or processors than those illustrated in FIG. 1 and/or may include more than one of any or all of the illustrated VoIP communication networks, access provider networks, devices, servers, systems, gateways, portals, and/or processors.

Figure 2:
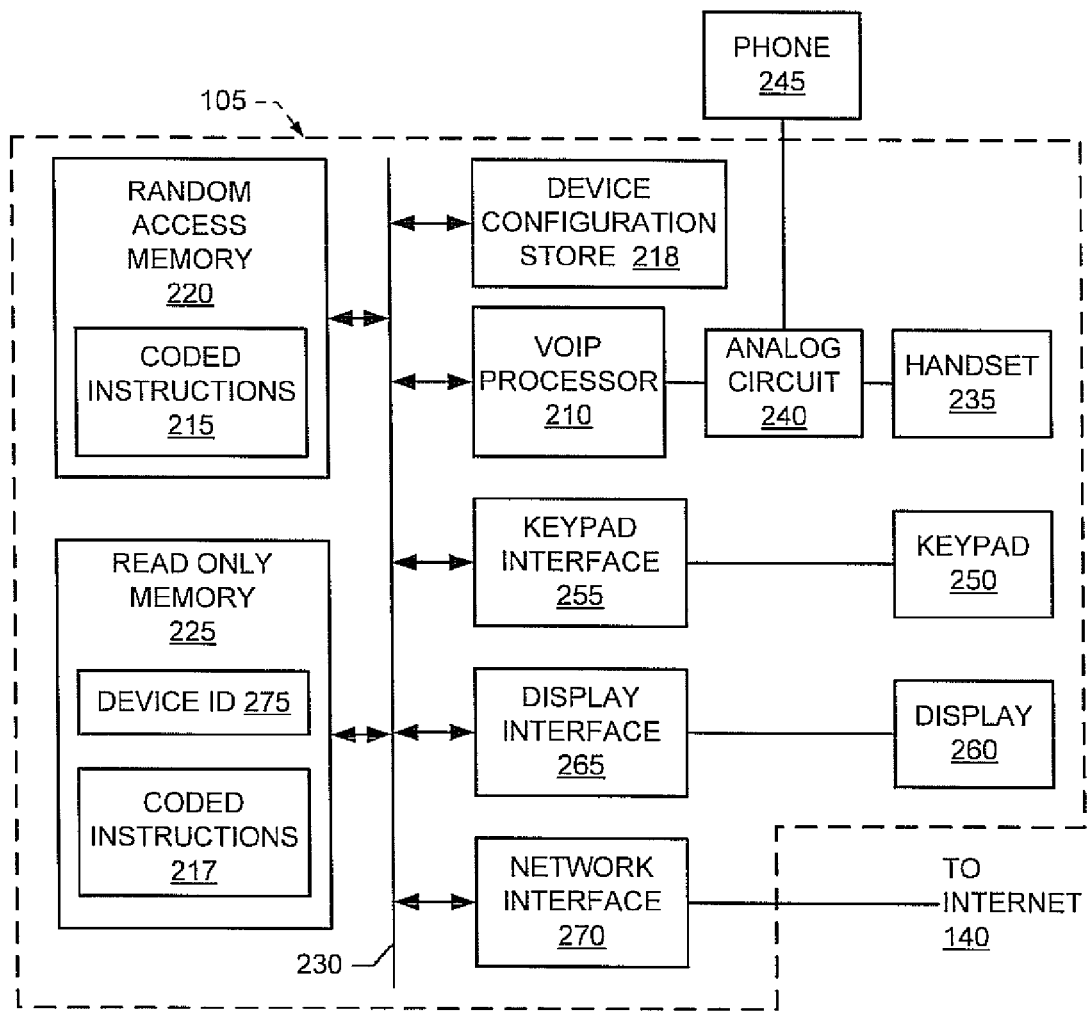
FIG. 2 illustrates an example manner of implementing any of the example VoIP devices of FIG. 1.

FIG. 2 illustrates an example manner of implementing any of the example VoIP devices 105A-D of FIG. 1. While any of the example VoIP devices 105A-D may be represented by FIG. 2, for ease of discussion, the example device of FIG. 2 will be referred to as VoIP device 105. To handle any of a variety of VoIP processing functions, the example VoIP device 105 of FIG. 2 includes any of a variety of VoIP processors 210. The example VoIP processor 210 of FIG. 2 implements, among other things, session control, VoIP protocols, a SIP user agent, and a coder (not shown) to encode speech signals, a decoder (not shown) to decode received speech signals, a packetizer (not shown) to packetize encoded speech data and a de-packetizer (not shown) to de-packetize encoded speech data.

In addition to any of a variety of specialized hardware, firmware and/or logic to perform VoIP processing functions, the example VoIP processor 210 of FIG. 2 may include any of a variety of specialized and/or general purpose controller(s) and/or processing unit(s) capable of executing coded instructions. For example, the controller and/or processing unit may perform any of a variety of VoIP processing functions by carrying out and/or executing coded instructions 215 and/or 217 present in a main memory of the VoIP processor 210 (e.g., within a random-access memory (RAM) 220 and/or a read-only memory (ROM) 225). For example, the coded instructions 215 and/or 217 may be carried out by the controller and/or processor to implement the examples discussed below in connection with FIGS. 7-11 and/or, more particularly, to provide and/or implement a micro-browser and/or activation application so that the VoIP device 105 can authenticate itself via, for example, a hypertext transfer protocol (HTTP) client-server handshake exchange and/or sequence. For example, a device authentication server (e.g., the example device authentication server 170 of FIG. 1) can query and/or request authentication credentials (e.g., a username, a password, an activation code, etc.) from the VoIP device 105 via the micro-browser and/or activation application. The micro-browser and/or activation application may, additionally or alternatively, provide any variety of user interfaces via, for example, an output device (e.g., a display 260) and/or an input device (e.g. a keypad 250) of the VoIP device 105. Such a user interface may be used to prompt and/or receive authentication credentials from a user, and/or to provide any general purpose applications such as, web browser functionality.

The example VoIP processor 210 is in communication with the main memory (including the ROM 225 and the RAM 220) and other devices and/or modules of the example VoIP device 105 of FIG. 2 via any type and/or number of buses 230. The example RAM 220 may be implemented by, for example, dynamic random-access memory (DRAM), synchronous dynamic random-access memory (SDRAM), and/or any other type of RAM device(s), and the example ROM 225 may be implemented by, for example, flash memory(-ies) and/or any other desired type of memory device(s). Access to the example memory 220 and 225 is typically controlled by a memory controller (not shown).

To store a device profile and/or one or more service and/or device configuration parameters and/or variables, the example VoIP device 105 of FIG. 2 includes a device configuration store 218. The example device configuration store 218 of FIG. 2 stores received device profile(s), testing, service configuration and/or provisioning data and/or information using any of a variety of data structure(s), array(s), table(s), database(s) or variable(s). The device configuration store 218 may be stored in any of a variety of memory devices such as a flash memory.

To electrically couple signals (e.g., speech signals) between handset 235 and the example VoIP processor 210, the example VoIP device 105 of FIG. 2 includes any of a variety of analog circuits 240. An example analog circuit 240 includes any of a variety of filter(s), analog-to-digital converter(s) and/or digital-to-analog converter(s) to convert between analog signals sent to and/or received from the example handset 235 and digital signals sent to and/or received from the example VoIP processor 210. The handset 235 can be corded or cordless.

To this end, the example analog circuit 240 of FIG. 2 may implement any of a variety of wireless communication technologies to communicatively couple the example VoIP processor 210 with any variety of cordless handset 235. Moreover, the example analog circuit 240 of FIG. 2 may, additionally or alternatively, implement any variety of SLIC to allow any variety of corded and/or cordless PSTN-based telephone 245 to be electrically coupled to the example VoIP processor 210 of FIG. 2. The latter example could be used, for instance, in implementations where the example VoIP device 105 is located in and/or implements a VoIP adapter and/or gateway.

To facilitate user inputs via any of a variety of keypads 250, the example VoIP device 105 of FIG. 2 includes any of a variety of keypad interfaces 255. The example keypad interface 255 of FIG. 2 electrically couples and/or translates electrical signals conveying key press information from the example keypad 250 to the example VoIP processor 210.

To provide output information to a user via any of a variety of displays 260, the example VoIP device 105 of FIG. 2 includes any of a variety of display interfaces 265. An example display interface 265 receives information (e.g., alphanumeric characters) to be displayed from the example VoIP processor 210 and creates electrical signals suitable for displaying the information on the example display 260. An example display 260 is a liquid-crystal display (LCD) screen.

The example handset 235 and/or the phone 245 may be used as additional and/or alternative input and/or output devices. For example, the VoIP processor 210 may, for example, receive key presses made via the handset 235 and/or the phone 245 as a sequence of one or more dual-tone multi-frequency (DTMF) signals. The VoIP processor 210 may provide outputs via the handset 235 and/or the phone 245 by, for example, providing audio signals that a user can listen and/or respond to, that is, the VoIP processor 210 can implement an interactive voice response system (IVRS).

To communicatively couple the example VoIP device 105 to the IP Network 145, a local-area network (LAN), a modem, a router, a bridge and/or a gateway, the example VoIP device 105 includes a network interface 270. The example network interface 270 of FIG. 2 implements any of a variety of communication and/or data interface(s) in accordance with any of a variety of current and/or future standards such as Ethernet, DSL, WiMax, WiFi, cable modems, etc. The example network interface 270 of FIG. 2 may be used to, for example, communicatively couple a personal computer to the VoIP device 105. The controller and/or processor of the example VoIP processor 210 may, for example, provide an interface for the coupled PC (e.g., the example PC 155 of FIG. 1) via the interface 270 to allow a user of the PC to configure, control and/or monitor the VoIP device 105. Input and/or output devices of such a PC (e.g., a keyboard and display) may also be used as additional and/or alternative input and/or output devices for the VoIP device 105.

To identify the VoIP device 105, the example VoIP device 105 of FIG. 2 includes a device identifier 275. The example device identifier 275 of FIG. 1 uniquely identifies the VoIP device 105 and is, for example, a manufacturing serial number, a media access control (MAC) address, etc. The example device identifier 275 of FIG. 1 is stored in any variety of non-volatile storage such as the ROM 225. The example VoIP processor 210 can read and/or obtain the device identifier 275 from the ROM 225 via the bus 230.

While an example VoIP device 105 is illustrated in FIG. 2, the VoIP device 105 may be implemented using any of a variety of other and/or additional processors, devices, components, circuits, modules, interfaces, etc. Further, the processors, devices, components, circuits, modules, elements, interfaces, etc. illustrated in FIG. 2 may be combined, re-arranged, eliminated and/or implemented in any of a variety of ways. Additionally, the example VoIP processor 210, the network interface 270 and/or the example VoIP device 105 may be implemented as any combination of firmware, software, logic and/or hardware. Moreover, the example VoIP device 105 may include additional processors, devices, components, circuits, interfaces and/or modules than those illustrated in FIG. 2 and/or may include more than one of any or all of the illustrated processors, devices, components, circuits, interfaces and/or modules.

Figure 3:
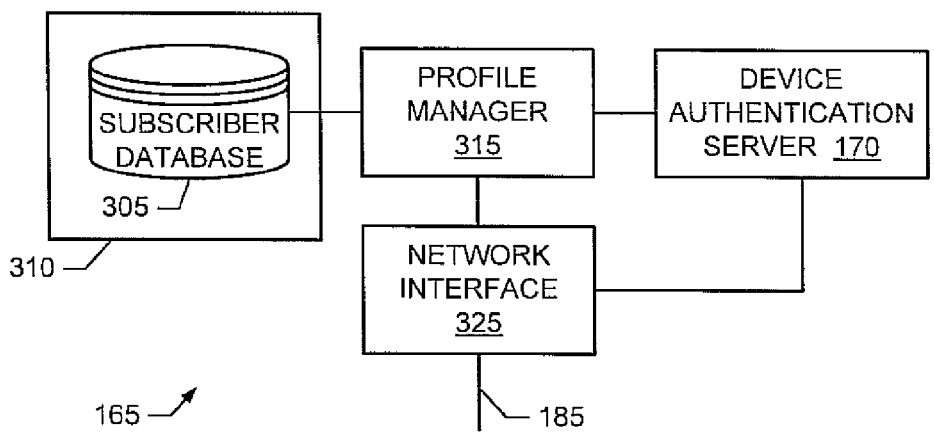
FIG. 3 illustrates an example manner of implementing the example device profile management server of FIG. 1.

FIG. 3 illustrates an example manner of implementing the example device profile management server 165 of FIG. 1. To store subscriber account information including VoIP device profiles, the example device profile management server 165 of FIG. 1 includes a subscriber database 305. The example subscriber database 305 of FIG. 3 stores subscriber accounts and/or device profiles using any of a variety of data structure(s), database(s), field(s), array(s), parameter(s) and/or variable(s). An example data structure that may be used for storing the subscriber account database 305 is discussed in connection with FIG. 4. The example subscriber database 305 is stored on any of a variety of storage devices 310 (e.g., a hard disk drive) and/or memory devices (e.g., RAM). While the example subscriber database 305 is illustrated as a part of the example device profile management server 165, any portion of the subscriber database 305 may be stored outside the device profile management server 165. For example, the subscriber database 305 of FIG. 3 may store only those subscriber accounts and/or VoIP device profiles associated with subscribers handled, configured and/or controlled by the device profile management server 165. Additionally or alternatively, the subscriber database 305 may store only a portion of each subscriber account (e.g., only associated VoIP device profiles) and remaining portions (e.g., authentication credentials) may be stored elsewhere in a VoIP communication network (e.g., an account and/or billing server).

To manage device profiles, the example device profile management server 165 of FIG. 3 includes a profile manager 315. In general, the example profile manager 315 of FIG. 3 receives requests for device profiles from VoIP devices 105A-D, provides device profiles to VoIP devices 105A-D, and/or requests authentication credentials from VoIP devices 105A-D. For example, the profile manager 315 implements any of the examples and/or example processes of FIGS. 7-9, 12, 13 and/or 14. The example profile manager 315 may be implemented by any variety of controller, processor and/or computing platform and/or device such as the example computing platform 1500 discussed in connection with FIG. 15. Alternatively, some or all of the example profile manager 315 may be implemented using any combination of application specific integrated circuit(s) (ASIC(s)), programmable logic device(s) (PLD(s)), field programmable logic device(s) (FPLD(s)), discrete logic, hardware, firmware, etc. Also, some or all of the example profile manager 315 may be implemented manually or as any combination(s) of the foregoing techniques, for example, any combination of firmware, software, discrete logic and/or hardware.

To authenticate VoIP devices 105A-D, the example device profile management server 165 of FIG. 3 may optionally include one or more device authentication servers 170. Additionally or alternatively, the device profile management server 165 may be communicatively coupled to one or more separate device authentication servers 170 as discussed in connection with FIG. 1. The example profile manager 315 and the device authentication server 170 collectively authenticate and associate VoIP devices 105A-D with subscriber accounts as discussed in more detail in connection with the examples of FIGS. 7-10.

To communicatively couple the example profile manager 315 and/or the example device authentication server 170 to the example network 185 (FIG. 1), the example device profile management server 165 includes a network interface 325. The example network interface 325 of FIG. 3 implements any communication and/or data interface(s) such as in accordance with the IEEE 802.3x family of Ethernet standards.

While an example device profile management server 165 is illustrated in FIG. 3, the device profile management server 165 may be implemented using any of a variety of other and/or additional processors, devices, components, circuits, modules, interfaces, etc. Further, the processors, devices, components, circuits, modules, elements, interfaces, etc. illustrated in FIG. 3 may be combined, re-arranged, eliminated and/or implemented in any of a variety of ways. Additionally, the example device profile management server 165 may be implemented as any combination of firmware, software, logic and/or hardware. For example, the example device profile management server 165 may be implemented as coded instructions executed by, for example, the example processor 1505 of FIG. 15. Moreover, the example device profile management server 165 may include additional processors, devices, components, circuits, interfaces and/or modules than those illustrated in FIG. 3 and/or may include more than one of any or all of the illustrated processors, devices, components, circuits, interfaces and/or modules.

FIG. 4 illustrates an example data structure that may be used to implement the subscriber database 305 of FIG. 3. The example data structure of FIG. 4 contains a plurality of entries 405 for respective ones of a plurality of subscriber accounts. To identify the subscriber account, each of the subscriber account entries 405 of FIG. 4 includes an account identifier field 410. The example account identifier field 410 of FIG. 4 contains a number (e.g., an account number) that uniquely identifies the subscriber account.

To specify a telephone number associated with the subscriber account, each of the subscriber account entries 405 of FIG. 4 includes a telephone number field 415. The example telephone number field 415 of FIG. 4 contains and/or represents a 10-digit telephone assigned to the subscriber account.

To specify a user name associated with the subscriber account, each of the subscriber account entries 405 of FIG. 4 includes a user name field 420. The example user name field 420 of FIG. 4 contains and/or represents an ASCII based user name assigned to and/or selected for the subscriber account.

To specify a password for the subscriber account (i.e., a potential authentication credential), each of the example subscriber account entries 405 of FIG. 4 includes a password field 425. The example password field 420 of FIG. 4 contains and/or represents a security password assigned to and/or selected for the subscriber account. In some examples, a password stored in the password field 420 is encrypted for security. As discussed below, the password stored in the password field 420 may be used to, for example, authenticate a VoIP device 105A-D against and/or to the subscriber account.

To specify a device identifier provisioned to the subscriber account, each of the subscriber account entries 405 of FIG. 4 includes a device identifier field 430. The example device identifier field 430 of FIG. 4 stores and/or represents an alphanumeric character string that uniquely identifies a VoIP device 105A-D. Example device identifiers stored in the device identifier field 430 include a manufacturing serial number, a MAC address, etc.

To specify an activation code (i.e., a potential authentication credential), each of the example subscriber account entries 405 of FIG. 4 includes an activation code field 435. The example activation code field 435 of FIG. 4 contains and/or represents an activation code assigned and/or selected for purposes of VoIP device 105A-D authentication.

To store service parameters, each of the example subscriber account entries 405 of FIG. 4 includes a service parameter field 440. The example service parameter field 440 of FIG. 4 contains, represents and/or points to, for example, a VoIP device configuration file, data and/or information associated with the VoIP device 105A-D associated with the subscriber account.

While an example data structure has been illustrated in FIG. 4, any of a variety of additional and/or alternative data structures, tables, arrays, registers, variables, etc. may be used to store the data and/or information useful to track and/or make erasure decisions. Moreover, the example data structure may include and/or store any of a variety of additional and/or alternative data and/or information associated with subscriber accounts such as, for example, billing information.

FIG. 5A illustrates an example manner of implementing any of the example device authentication servers 170 of FIGS. 1 and/or 3. To allow a VoIP device 105A-D, a user via a VoIP device 105A-D (e.g., via a micro-browser implemented and/or provided by the VoIP device 105A-D), and/or a user (e.g., via any web browser) to authenticate and associate a VoIP device 105A-D with a particular subscriber account, the example device authentication server 170 of FIG. 5A includes a web server 510. The example web server 510 of FIG. 5A provides a web-based configuration interface for a VoIP device 105A-D (e.g., an HTTP client server handshake sequence and/or exchange) and/or any general-purpose web browser via the IP network 140 (FIG. 1). As discussed below in connection with FIGS. 7-9, and FIGS. 12-15, the example web server 510 interacts with the device profile management server 165, a VoIP device 105A-D and/or a user of the VoIP device 105A-D to authenticate the VoIP device 105A-D and, thus, provision it to a particular subscriber account. In such examples, the VoIP device 105A-D provides and/or implements a micro-browser and/or activation application to facilitate interactions with the web server 510. For example, the example web server 510 of FIG. 5A queries and/or request authentication credentials (e.g., a user name, a password, an activation code, etc.) from the VoIP device 105A-D by interacting with a micro-browser and/or activation application via an HTTP sequence.

To communicatively couple the example web server 510 to the example network 185 (FIG. 1), the example device authentication server 170 of FIG. 5A includes a network interface 520. The example network interface 520 of FIG. 5A implements any communication and/or data interface(s) such as in accordance with the IEEE 802.3x family of Ethernet standards.

FIG. 5B illustrates another example manner of implementing any of the example device authentication servers 170 of FIGS. 1 and/or 3. To allow a user via a VoIP device 105A-D (e.g., using a handset and/or telephone connected to the VoIP device 105A-D) to authenticate and associate a VoIP device 105A-D with a particular subscriber account, the example device authentication server 170 of FIG. 5B includes an interactive voice response system (IVRS) 530. The example IVRS 530 of FIG. 5B provides audible prompts to a user and receives user selections from the user by receiving, for example, DTMF signals (e.g., key press information). In some examples, the prompts and/or the user selections occur via a VoIP device 105A-D. In other examples, the prompts and/or user selections occur via a traditional phone not associated and/or connected to a VoIP device 105A-D. As discussed below in connection with FIGS. 7-9, and FIGS. 12-15, the IVRS 530 interacts with the device profile management server 165, a user of a VoIP device 105A-D and/or the VoIP device 105A-D to authenticate the VoIP device 105A-D and, thus, provision it to a particular subscriber account.

To communicatively couple the example web server 510 to the example network 185 (FIG. 1), the example device authentication server 170 of FIG. 5B includes a network interface 540. The example network interface 540 of FIG. 5A implements any communication and/or data interface(s) such as in accordance with the IEEE 802.3x family of Ethernet standards.

While example device authentication servers 170 are illustrated in FIGS. 5A and 5B, device authentication servers 170 may be implemented using any of a variety of other and/or additional processors, devices, components, circuits, modules, interfaces, etc. Further, the processors, devices, components, circuits, modules, elements, interfaces, etc. illustrated in FIGS. 5A and/or 5B may be combined, re-arranged, eliminated and/or implemented in any of a variety of ways. For example, a device authentication server 170 may include one or more web servers 150 and/or one or more IVRSs 530. Additionally, the example device authentication servers 170 may be implemented as any combination of firmware, software, logic and/or hardware. For example, the example device authentication servers 170 may be implemented as coded instructions executed by, for example, the example processor 1505 of FIG. 15. Moreover, the example device authentication servers 170 may include additional processors, devices, components, circuits, interfaces and/or modules than those illustrated in FIGS. 5A and/or 5B and/or may include more than one of any or all of the illustrated processors, devices, components, circuits, interfaces and/or modules.

FIGS. 6A and 6B illustrate example data structures that may be used by a VoIP device 105A-D to provide authentication credentials, data and/or information to a device authentication server 170 and/or a device profile management server 165. The example data structures of FIGS. 6A and 6B can be sent as, for example, as a packet of an HTTP client server handshake exchange and/or sequence.

Turning to FIG. 6A, to delineate start of a packet, the example data structure of FIG. 6A includes any variety of header 605 such as an IP packet header. To provide an activation code (i.e., an authentication credential), the example data structure of FIG. 6A includes an activation code field 610. The example activation code field 610 of FIG. 6A contains and/or represents an activation code provided to a user by an order entry system (e.g., the example order entry system 175 of FIG. 1) and entered into and/or provided to a VoIP device 105A-D by the user. In response to, for example, a query from a device authentication server (e.g., the example authentication servers 170 of FIGS. 1, 3 and/or 5A), the VoIP device 105A-D provides the activation code via the example packet of FIG. 6A. For security purposes, the activation code provided in the activation code field 610 may be optionally encrypted.

To specify a device identifier to be associated with and/or provisioned to the subscriber account that corresponds to the activation code contained in the activation code field 610, the example data structure of FIG. 6A includes a device identifier field 615. The example device identifier field 615 of FIG. 6A stores and/or represents an alphanumeric character string that uniquely identifies a VoIP device 105A-D. Example device identifiers include a manufacturing serial number, a MAC address, etc.

Turning to FIG. 6B, to delineate start of a packet, the example data structure of FIG. 6B includes any variety of header 620 such as an IP packet header. To provide a user name and a password (i.e., authentication credentials), the example data structure of FIG. 6B includes a user name field 625 and a password field 630. The example user name field 625 of FIG. 6B contains and/or represents an ASCII based user name assigned to and/or selected for the subscriber account. The example password field 630 of FIG. 6B contains and/or represents a security password assigned to and/or selected for the subscriber account. In some examples, a password stored in the password field 630 is encrypted for security.

To specify a device identifier to be user name code field 615, the example data structure of FIG. 6B includes a device identifier field 635. The example device identifier field 635 of FIG. 6B stores and/or represents an alphanumeric character string that uniquely identifies a VoIP device 105A-D. Example device identifiers include a manufacturing serial number, a MAC address, etc.

While example data structures have been illustrated in FIGS. 6A and 6B, any of a variety of additional and/or alternative data structures, tables, arrays, registers, variables, etc. may be used to transmit and/or convey device identifiers and/or authentication credentials. Moreover, the example data structures may include any of a variety of additional and/or alternative data and/or information associated with subscriber accounts such as, for example, billing information.

Figure 7:
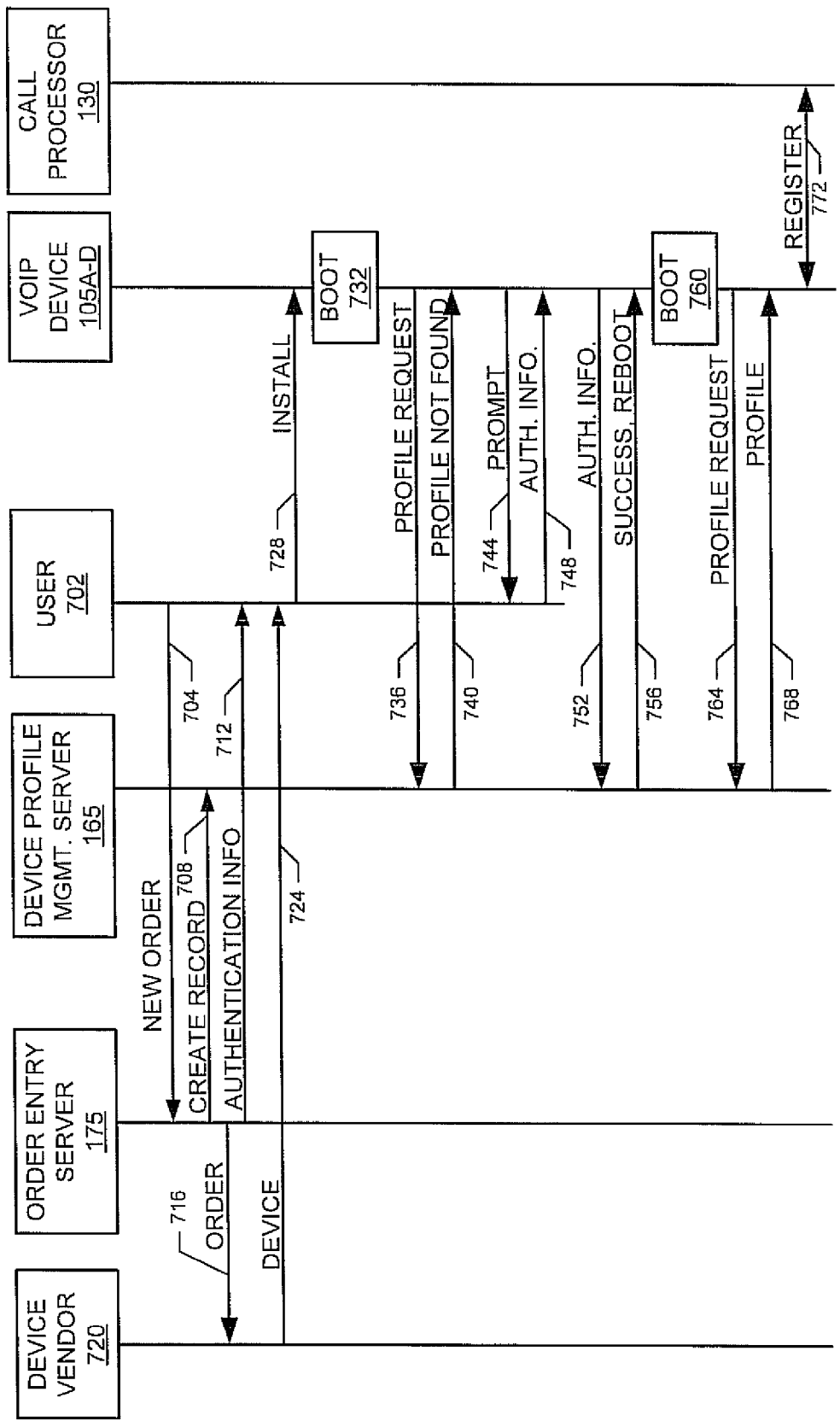
FIGS. 7, 8 and 9 are diagrammatic illustrations of example behaviors of the example VoIP system of FIG. 1.
Figure 8:
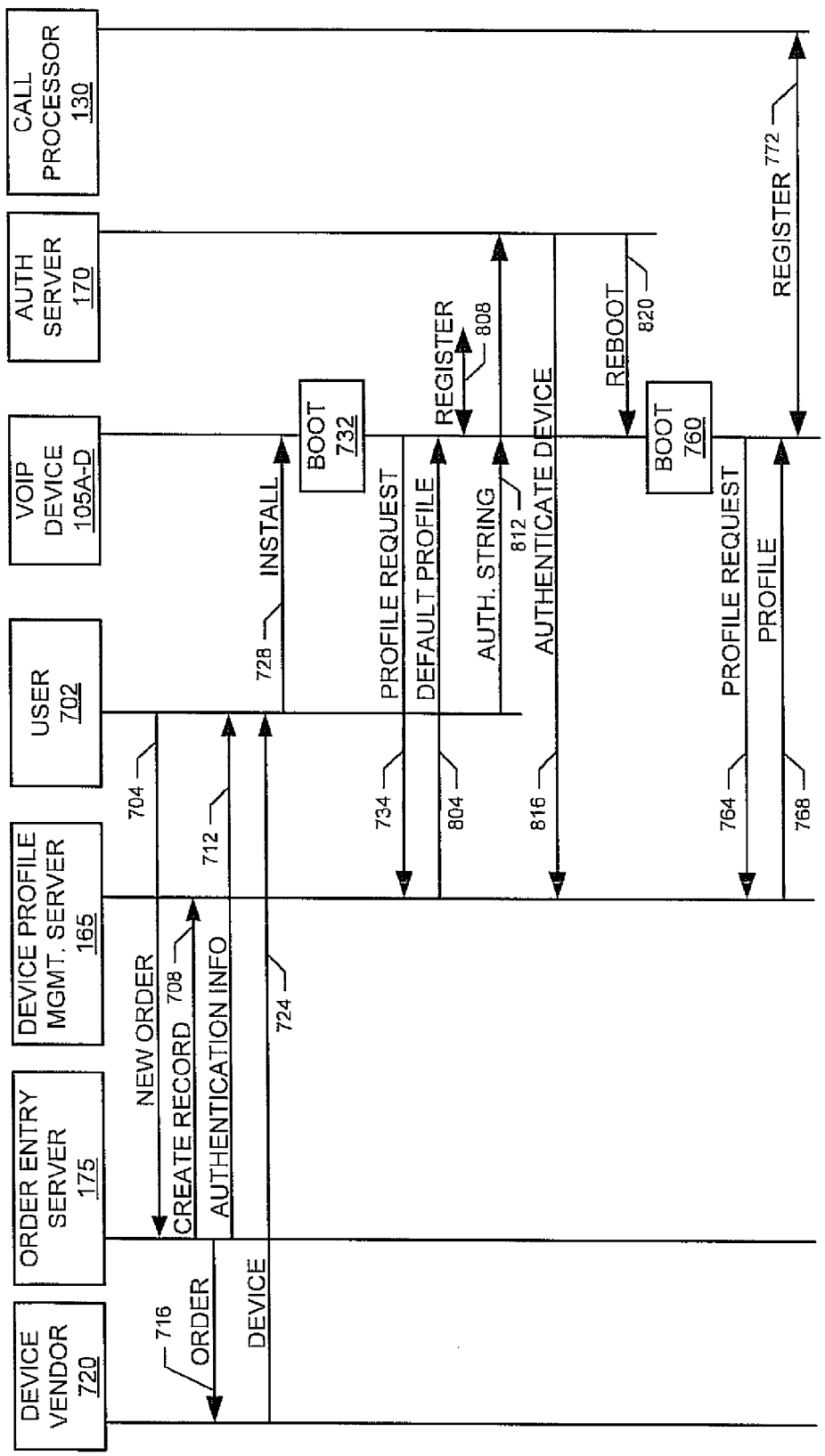
Figure 9:
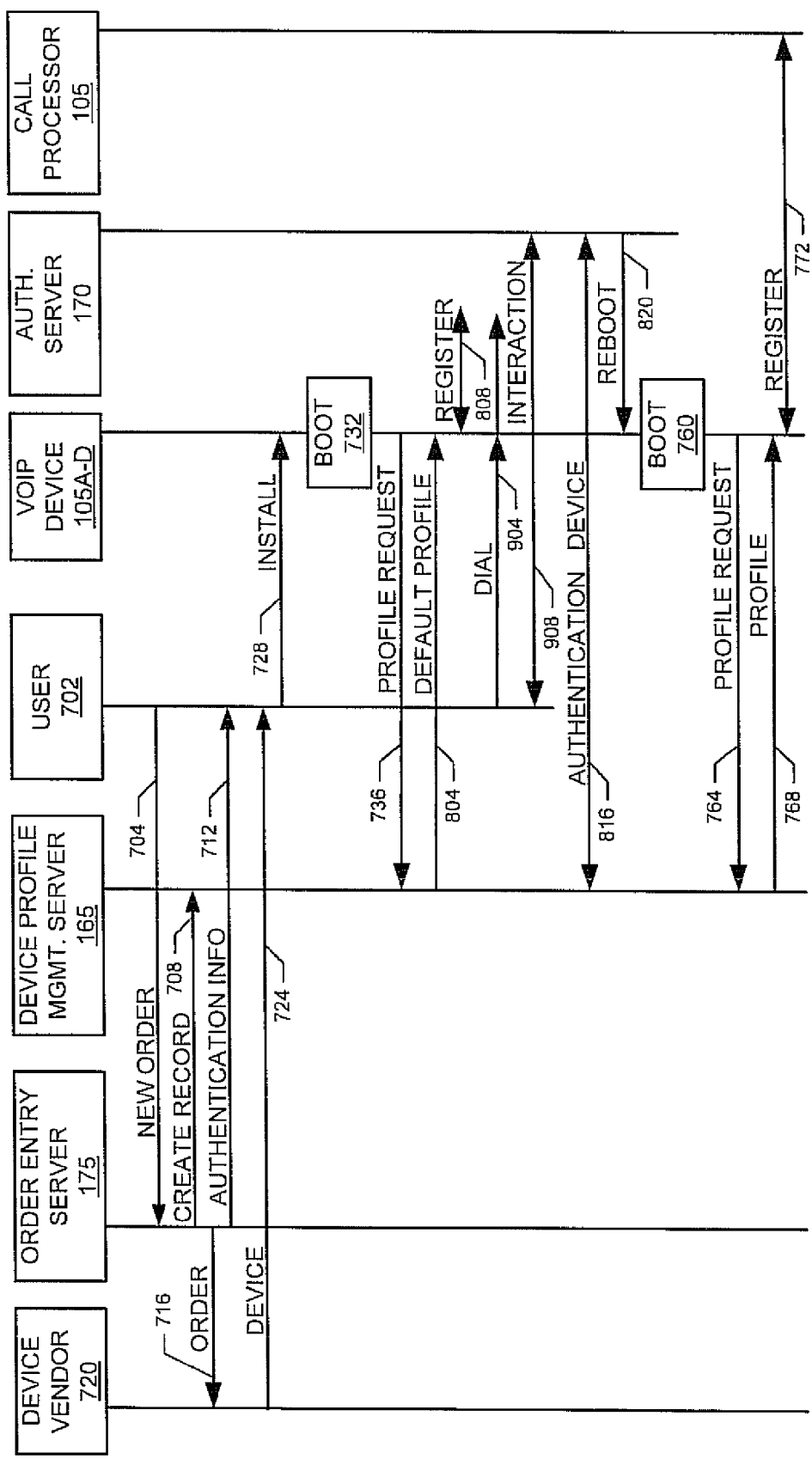

FIGS. 7, 8 and 9 diagrammatically illustrate example behaviors of the example VoIP communication system of FIG. 1. In general, as shown in the illustrated examples, a VoIP device 105 when installed attempts to request a device profile for a subscriber account. Because the VoIP device 105A-D is not yet authenticated and, thus, not associated with a subscriber account, at least one authentication credential is provided by and/or via the VoIP device to a device authentication server (e.g., the device authentication server 170 of FIGS. 1, 3, 5A and/or 5B). In the illustrated examples, the order entry server 175 does not have knowledge of the actual VoIP device 105A-D that will be shipped to the customer 702 by a VoIP device vendor 720 and, thus, the VoIP device 105A-D is not provisioned to the subscribers account. Instead, as discussed below, the VoIP device 105A-D and/or a user 702 of the VoIP device 105A-D must provide the device identifier of the VoIP device 105A-D and at least one authentication credential to the device profile management server 165 and/or a device authentication server 170 to authenticate the VoIP device 105A-D so that it can be provisioned to with the subscriber's account.

Turning first to FIG. 7, in general, a user 702 of a VoIP device 105A-D is prompted by the VoIP device 105A-D to enter and/or provide an authentication credential, and the VoIP device 105A-D then provides the authentication credential to a device profile management server 165 (e.g., more particularly to a device authentication server 165 that is implemented as a part of the device profile management server 165 (FIG. 3)). While in the illustrated example of FIG. 7, the VoIP device 105A-D interacts with the device authentication server of the example device profile management server 165, the VoIP device 105A-D could have interacted with a separately implemented device authentication server 170 in addition to the example device profile management server 165.

The device profile management server 165 performs a query of a subscriber account database to compare the authentication credential with subscriber accounts. If the authentication credential matches the authentication credential associated with a particular subscriber account, the device identifier of the VoIP device 105A-D is provisioned to the subscriber account.

The illustrated example of FIG. 7 begins with the customer 702 initiating via, for example, a customer service representative and/or a web-based interface a new order 704 for a VoIP service. The new order 704 may be, but not limited to, a new VoIP service, to add an additional VoIP device 105A-D to an existing subscriber account, and/or to remove a VoIP device 105A-D from an existing subscriber account.

Upon receipt and/or entry of the new order 704, the example order entry server 175 of FIG. 7 creates and/or updates a subscriber account entry and/or record as illustrated in FIG. 7 (reference numeral 708), and sends one or more authentication credentials, data and/or information 712 to the user 702. The authentication credentials 712 may be sent to the subscriber 702 using any of combination of postal mail, electronic mail, text message, pager, text displayed on a screen, etc. The order entry server 175 also sends an order 716 for a VoIP device 105A-D to a VoIP device vendor 720. The example vendor 720 of FIG. 7 ships, delivers and/or provides a VoIP device 105A-D to the customer 702 (reference numeral 724).

After receiving the VoIP device 105A-D and the authentication credentials 712, the customer installs 728 the VoIP device 105A-D. Upon power on and/or boot 732 of the VoIP device 105A-D, the VoIP device 105A-D requests a device profile from the device profile management server 165 (reference numeral 736). In the illustrated example, the request 736 includes the device identifier (e.g., the example device identifier 275 of FIG. 2) of the VoIP device 105A-D.

Because the device identifier provided in the request 736 is not associated with any subscriber account, the device profile management server 165 (or a device authentication server 170 associated with and/or implemented by the device profile management server 165) indicates to the VoIP device 105A-D that the VoIP device 105A-D has not yet been authenticated (reference numeral 740). In response to the profile not found indication 740, the VoIP device 105A-D of the illustrated example prompts 744 the user 702 of the VoIP device 105A-D for authentication information (e.g., a user name and password, an activation code, etc.). When authentication information 748 is received from the user 702, the example VoIP device 105A-D of FIG. 7 provides the authentication information 752 to the device profile management server 165. Example data structures for providing the authentication information 752 are discussed in connection with FIGS. 6A and 6B.

Alternatively, rather than returning a profile not found indication 740, the device profile management server 165 can return a default device profile that contains, for example, a URL identifying a device authentication server 170 (e.g., the example web server 510 of FIG. 5A) that the VoIP device 105A-D can use to authenticate the VoIP device 105A-D. In some examples, the user 702 via a micro-browser provided and/or implemented by the VoIP device 105A-D interacts with the web server 510 to provide authentication credentials.

If the authentication information 752 corresponds and/or matches a subscriber account, the device profile management server 165 of FIG. 7 sends a success indication 756 to the VoIP device 105A-D that includes an indication that the VoIP device 105A-D is able to request and/or otherwise obtain a device profile for the newly authenticated VoIP device 105A-D. In the illustrated example of FIG. 7, the VoIP device 105A-D performs a reboot 760. However, the VoIP device 105A-D may trigger the requesting and/or otherwise obtaining of the device profile via any other method, such as, performing a re-initialization, performing a re-start, requesting a device profile, etc.

When the example reboot 760 of FIG. 7 is completed, the example VoIP device 105A-D of FIG. 7 requests 764 the device profile for the VoIP device 105A-D. Because the VoIP device 105A-D has been authenticated and associated with a subscriber account, the device profile management server 165 provides a corresponding device profile 768 to the VoIP device 105A-D. The VoIP device 105A-D uses one or more parameters from the device profile 768 to register itself with a serving VoIP call processor (e.g., the example call processor 130 of FIG. 1) (reference numeral 772). Upon completion of the registration 772, use of VoIP services via the VoIP device 105A-D can begin.

Turning next to the example of FIG. 8, in general, the VoIP device 105A-D is provided a default device profile 804 that allows the VoIP device 105A-D to register with a call processor (not shown) for at least a minimum set of VoIP functionality (e.g., support 911 and/or customer service calls). The supported VoIP functionality allows a user of the VoIP device 105A-D to enter and/or dial an activation code that the VoIP device 105A-D provides and/or passes along to call processor. The call processor provides the activation code to the device authentication server 170 that authenticates the VoIP device 105A-D based on the dialed activation code. Because portions of the example scenario of FIG. 8 are identical to that discussed above in connection with FIG. 7, the description of the identical portions is not repeated here. Instead, identical elements are illustrated with identical reference numerals in FIGS. 7 and 8, and the interested reader is referred back to the descriptions presented above in connection with FIG. 7 for a complete description of those like numbered elements.

In more detail, upon receipt of the profile request 734 and after determining that the VoIP device 105A-D is not yet provisioned to a subscriber account, the example device profile management server 165 of FIG. 8 provides a default device profiled 804 to the VoIP device 105A-D. In the illustrated example, the VoIP device 105A-D uses the default device profile 804 to register for at least limited VoIP services and/or capabilities with a call processor (not shown) as illustrated with reference numeral 808 in FIG. 8.

When the example user 702 of FIG. 8 dials an activation code 812 (i.e., an authentication credential received in a message from the order entry server 175), the VoIP device 105A-D provides the dialed digits to the call processor that, in turn, provides the dial activation code to the device authentication server 170. The example device authentication server 170 of FIG. 8 compares the activation code against activation codes for existing subscriber accounts to determine if the activation code matches a subscriber account (reference numeral 816). In some examples, the device authentication server 170 directly compares the activation code with the activation codes of subscriber accounts. In other examples, the device authentication server 170 provides the activation code and device identifier to the device profile management server 165 which compares the activation code with activation codes of subscriber accounts.

If the activation code matches a subscriber account, the example device profile management server 165 of FIG. 8 associates the device identifier of the VoIP device 105A-D with the subscriber account, and the example device authentication server 170 instructs the VoIP device 105A-D to request and/or otherwise obtain a device profile for the newly authenticated VoIP device 105A-D. In the illustrated example of FIG. 8, the VoIP device 105A-D performs a reboot in response to the instruction received from the device authentication server 170 (reference numeral 820). However, the VoIP device 105A-D may trigger the requesting and/or otherwise obtaining of the device profile via any other method, such as, performing a re-initialization, performing a re-start, requesting a device profile, etc. In some examples, the device authentication server 170 provides an audible prompt to the user 702 via the VoIP device 105A-D to reboot the VoIP device 105A-D. The remaining portions of the illustrated example of FIG. 8 proceed identically to that discussed above in connection with FIG. 7 and the interested reader is referred back to the descriptions presented above in connection with FIG. 7 for a complete description of those like numbered elements.

Turning now to the example of FIG. 9, in general, the VoIP device 105A-D is provided a default device profile 804 that allows the VoIP device 105A-D to register with a call processor (not shown) for at least a minimum set of VoIP functionality (e.g., support 911 and/or customer service calls). The supported VoIP functionality allows a user of the VoIP device 105A-D to dial a telephone number that the VoIP device 105A-D provides and/or passes along to call processor. In the illustrated example, upon receipt of a dialed number, the call processor routes the telephone call to a device authentication server (e.g., the example IVRS 530 of FIG. 5B). Because portions of the example scenario of FIG. 9 are identical to that discussed above in connection with FIGS. 7 and/or 8, the description of the identical portions is not repeated here. Instead, identical elements are illustrated with identical reference numerals in FIGS. 7, 8 and 9, and the interested reader is referred back to the descriptions presented above in connection with FIGS. 7 and/or 8 for a complete description of those like numbered elements.

When the example user 702 of FIG. 8 dials any telephone number 904 (possibly with the exception of 911 and/or customer service telephone numbers), the call process connects the VoIP device 105A-D to the device authentication server 170 instead of the user's intended callee. The device authentication server 170 implements and/or includes an IVRS (e.g., the example IVRS 530 of FIG. 5B). In the illustrated example, the IVRS of the device authentication server 170 interacts 908 with the user 702 via the VoIP device 105A-D. In particular, the IVRS provides audible prompts to a user and receives user selections from the user by, for example, receiving DTMF signals (e.g., key press information) via the VoIP device 105A-D. The authentication server 170 uses the prompts and user selections to obtain an authentication credential from the user.

In some alternative and/or additional examples, the prompts and/or the user selections can occur via a device other than the VoIP device 105A-D. For example, when an order entry server (e.g., the example order entry server 175 of FIG. 1) provides authentication information to the user 702, the order entry server 175 could provide a telephone number that can be called directly from any phone to allow a subscriber to authenticate a VoIP device 105A-D. In such examples, the device identifier for the VoIP device 105A-D and/or the authentication credential need not be provided via the VoIP device 105A-D being authenticated.

The remaining portions of the illustrated example of FIG. 9 proceed identically to that discussed above in connection with FIGS. 7 and/or 8 and the interested reader is referred back to the descriptions presented above in connection with FIGS. 7 and/or 8 for a complete description of those like numbered elements.

While example behaviors of the example system of FIG. 1 are illustrated in FIGS. 7-9, persons of ordinary skill in the art will readily appreciate that the authentication, associating and/or provisioning of VoIP device 105A-D to subscriber accounts can be performed using any of a variety of other and/or additional method(s), process(es), action(s), protocol(s), exchange(s) and/or message(s). Further, the example exchanges illustrated in FIGS. 7, 8 and/or 9 may include additional method(s), process(es), action(s), protocol(s), exchange(s) and/or message(s) and/or may include more than one of any or all of the illustrated method(s), process(es), action(s), protocol(s), exchange(s) and/or message(s).

Figure 10:
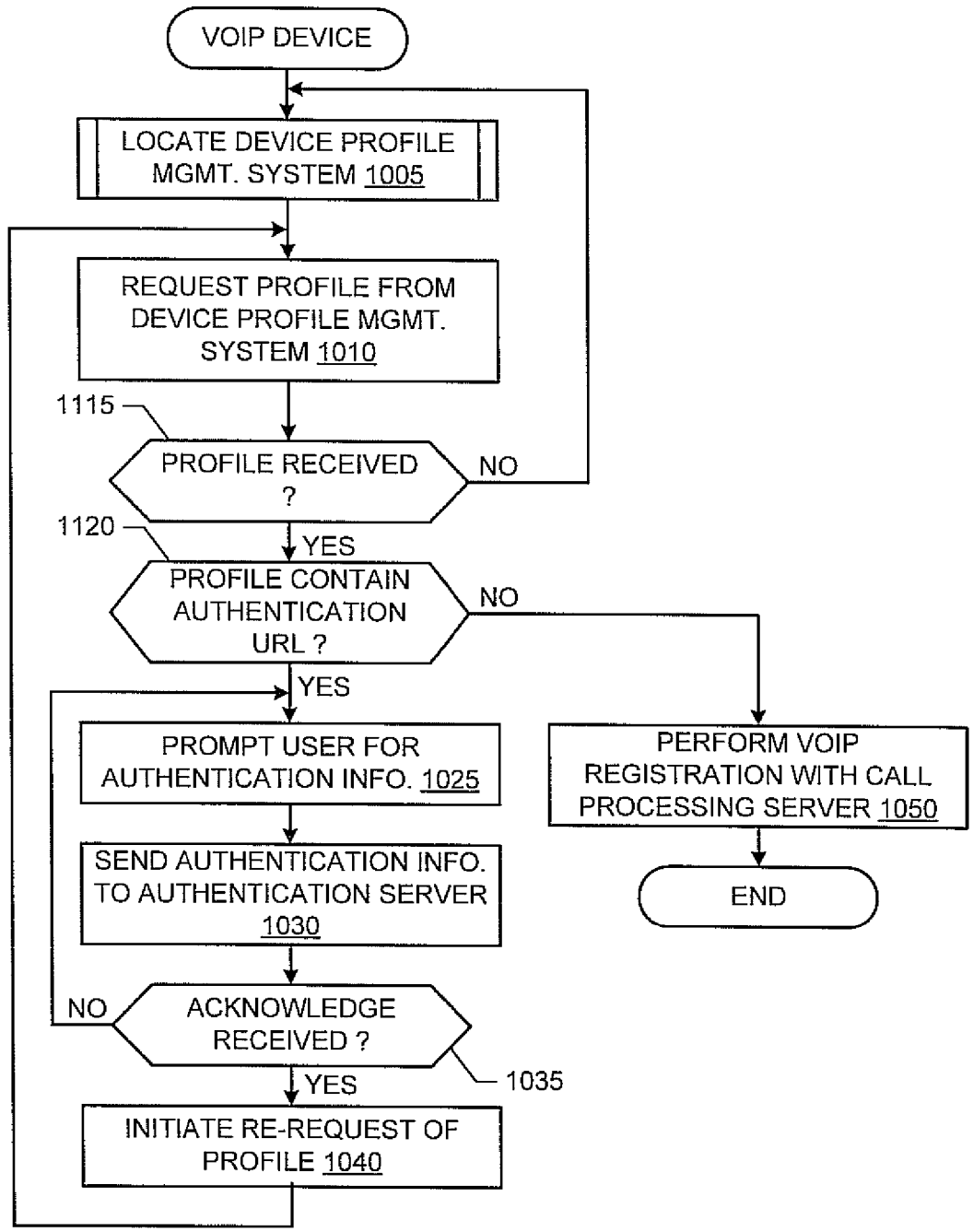
FIGS. 10 and 11 are flowcharts representative of example machine readable instructions which may be executed to implement any of the example VoIP devices of FIGS. 1 and/or 2.
Figure 11:
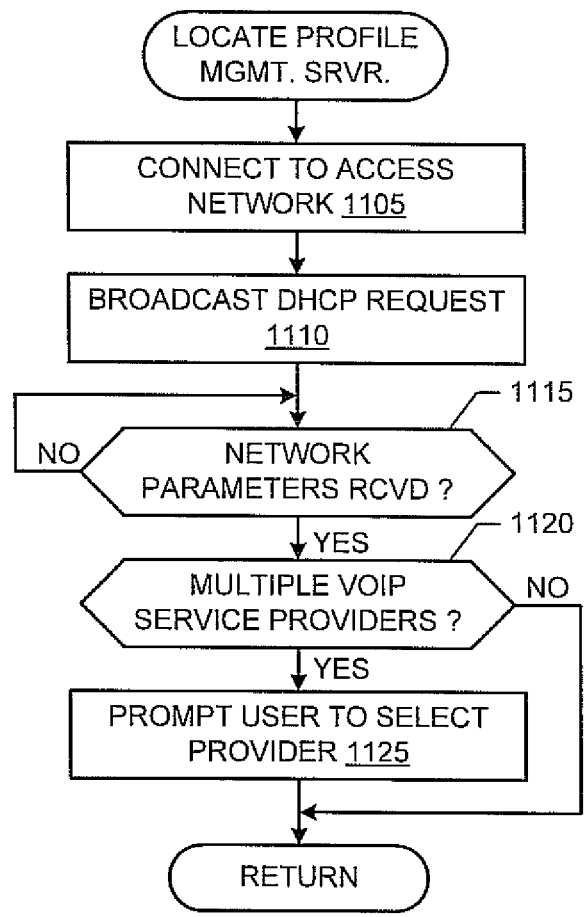
Figure 12:
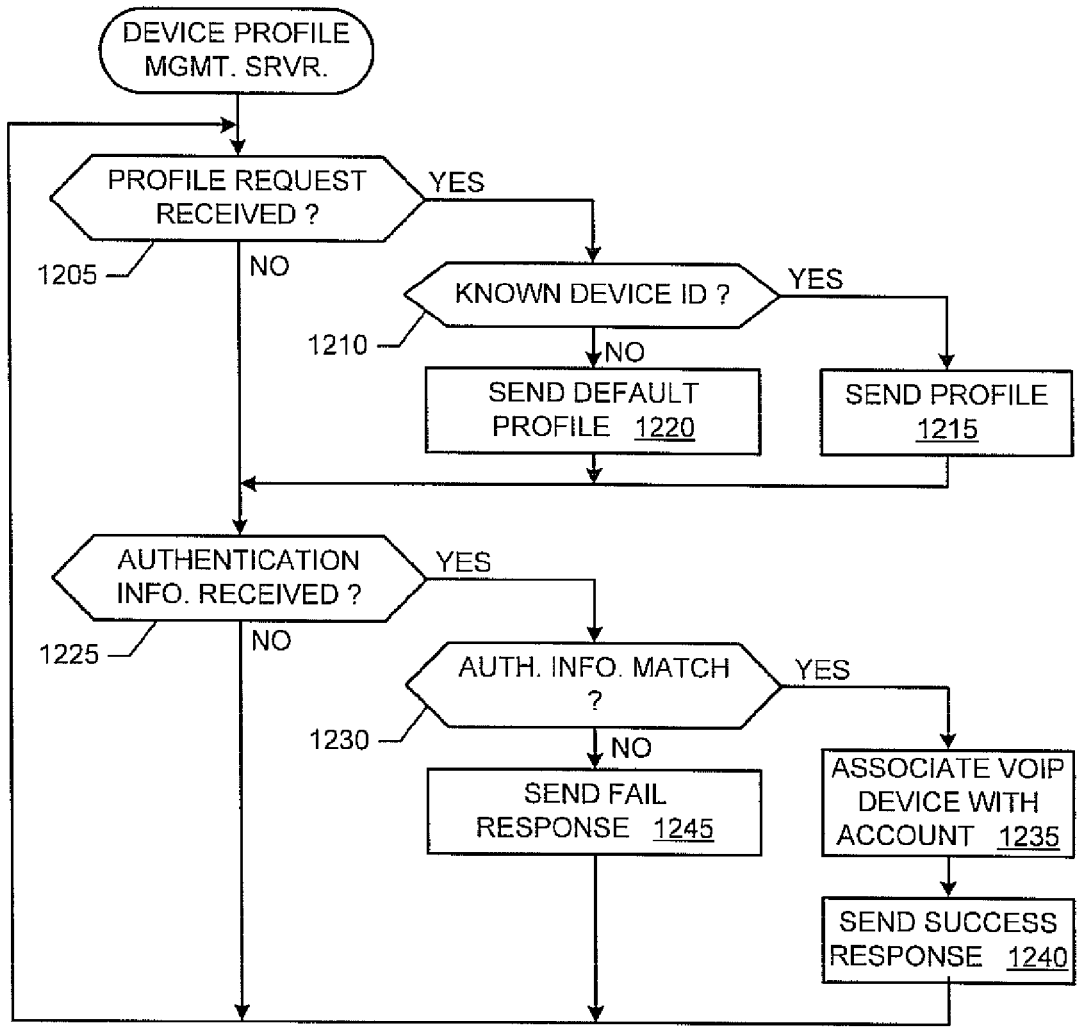
FIGS. 12, 13 and 14 are flowcharts representative of example machine readable instructions which may be executed to implement any of the example device profile management server and/or the example device authentication servers of FIGS. 1, 3, 5A and/or 5B.
Figure 13:
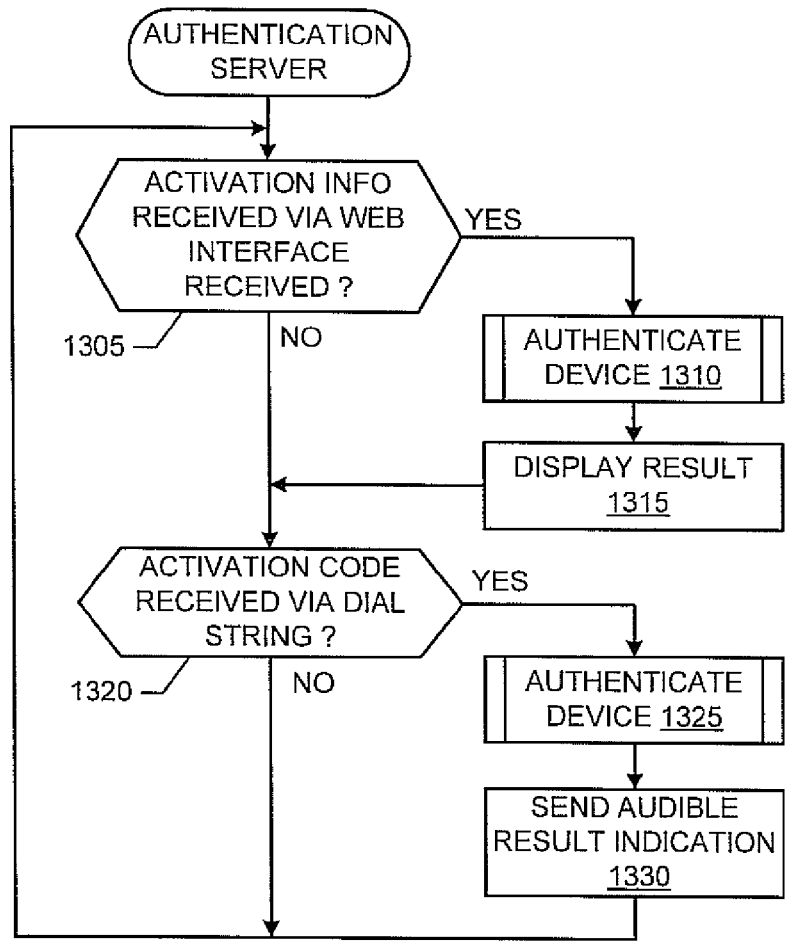
Figure 14:
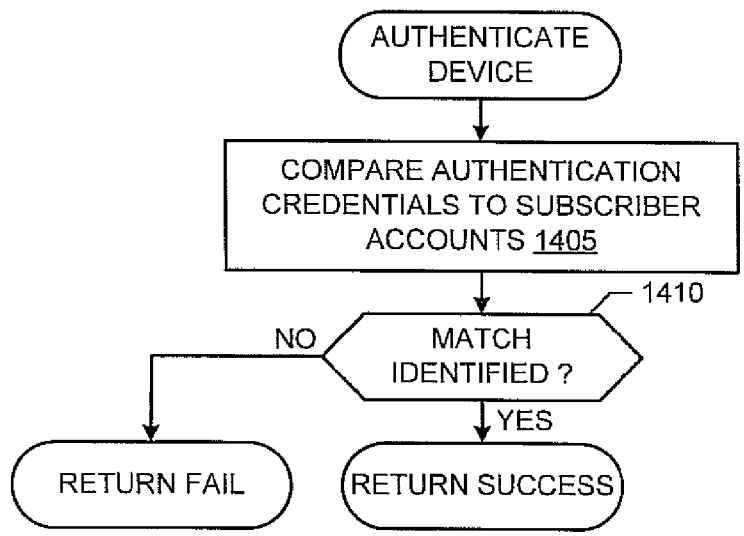

FIGS. 10 and 11 are flowcharts representative of example machine accessible instructions that may be executed to implement any of the example VoIP devices 105A-D. FIG. 12 is a flowchart representative of example machine accessible instructions that may be executed to implement the example device profile management device 165, and FIGS. 13 and 14 are flowcharts representative of example machine accessible instructions that may be executed to implement the example authentication servers 170. The example machine accessible instructions of FIGS. 10, 11, 12, 13 and/or 14 may be executed by a processor, a controller and/or any other suitable processing device. For example, the example machine accessible instructions of FIGS. 10, 11, 12, 13 and/or 14 may be embodied in coded instructions stored on a tangible medium such as a flash memory, or RAM associated with a processor (e.g., the example processor 210 discussed above in connection with FIG. 2 and/or the example processor 1505 discussed below in connection with FIG. 15). Alternatively, some or all of the example flowcharts of FIGS. 10, 11, 12, 13 and/or 14 may be implemented using any of a variety of ASIC(s), PLD(s), FPLD(s), discrete logic, hardware, firmware, etc. Also, some or all of the example flowcharts of FIGS. 10, 11, 12, 13 and/or 14 may be implemented manually or as any combination(s) of the foregoing techniques, for example, any combination of firmware, software, discrete logic and/or hardware. Further, although the example machine accessible instructions of FIGS. 10-14 are described with reference to the flowcharts of FIGS. 10-14 persons of ordinary skill in the art will readily appreciate that many other methods of implementing the example VoIP devices 105A-D, the example device profile management server 165, the example device authentication server 170, the examples of FIGS. 7-9 and/or, more generally, the VoIP communication system of FIG. 1 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 10, 11, 12, 13 and/or 14 may be carried out sequentially and/or carried out in parallel by, for example, separate processing threads, processors, devices, discrete logic, circuits, etc.

The example machine readable instructions of FIG. 10 begin when a VoIP device (e.g., the example VoIP device 105A-D of FIGS. 1 and/or 2) powers up and/or is initialized. Upon completion of power up, re-start, initialization and/or re-initialization (e.g., boot or reboot), the VoIP device locates a device profile management server by, for example, executing the example machine accessible instructions of FIG. 11 (block 1005).

Having located a device profile management server (e.g., the example device profile management server 165 of FIG. 1) (block 1005), the VoIP device requests a device profile from the device profile management server (block 1010). If a device profile is not received (block 1015), control returns to block 1005 to repeat the process of locating a device profile management server.

If a device profiled is received (block 1015) and contains an identifier for an authentication server (e.g., the example web server 510 of FIG. 5A) (block 1020), the VoIP device prompts the user for an authentication credential (block 1025) and provides the authentication credential to the device authentication server (block 1030). Alternatively, if a received profile contains a URL of a web server (block 1020), the VoIP device provides and/or implements a web browser that allows the user to be prompted for (block 1025) and provide an authentication credential (block 1030) directly to the web server via the VoIP device.

Once the authentication credential is provided to the device authentication server (block 1030), the VoIP device waits to receive an acknowledgement that the VoIP device was authenticated and associated with and/or provisioned to a subscriber account (block 1035). If an authentication acknowledgement is not received, the control returns to block 1025 to reattempt the VoIP authentication. If the VoIP is successfully authenticated (block 1035), the VoIP device performs a reboot (block 1040) that causes control to return to block 1010 to request a device profile. However, the VoIP device may, additionally or alternatively, perform any of a variety of actions and/or methods that cause control to return to block 1010 to request a device profile. For example, the VoIP device could perform a re-initialization, a restart, etc.

Returning to block 1020, if the device profile does not contain an identifier of an authentication server (block 1020), the VoIP device registers itself with the VoIP call processor identified in the received device profile (block 1050) and control exits from the example machine accessible instructions of FIG. 10.

The example machine accessible instructions of FIG. 11 begin, for example, when called by the example machine accessible instructions of FIG. 10 at block 1005. The VoIP device first establishes a network connection to a LAN, a router, a gateway, etc. that facilitates a connection to an IP network (e.g., the example IP network 145 of FIG. 1) (block 1105). The VoIP device broadcasts a DHCP request to obtain an IP address for the VoIP device (block 1110) and waits to receive network parameters (e.g., an IP address) (block 1115).

When network parameters are received (block 1115), the VoIP device determines based upon the network parameters if more than one VoIP service provider is available (block 1120). For example, the VoIP device may contact a web site that contains and/or lists VoIP service providers available to the VoIP device.

If there are more than one potential VoIP service providers (block 1120), the VoIP device prompts the user to select a service provider (block 1125). For example, the VoIP device provides and/or implements a web browser that allows the user to view information regarding VoIP service providers and/or select a service provider. Control then returns from the example machine accessible instructions of FIG. 11 to, for example, the example machine accessible instructions of FIG. 10 at block 1010.

Returning to block 1120, if there is only one possible VoIP service provider (block 1120), the VoIP service provider is selected by default and control returns from the example machine accessible instructions of FIG. 11 to, for example, the example machine accessible instructions of FIG. 10 at block 1010.

The example machine accessible instructions of FIG. 12 begin with a device profile management server (e.g., the example device profile management server 165 of FIG. 1) checking if a request for a device profile has been received (block 1205). If a request for a device profile has been received (block 1205), the device profile management server determines if the request VoIP device has a device identifier that is already provisioned to a subscriber account (block 1210). If the device identifier is already associated with a subscriber account (block 1210), the device profile management server sends the device profile associated with the subscriber account to the VoIP device (block 1215). Control then proceeds to block 1225 to check if authentication information has been received.

Returning to block 1210, if the device identifier is not already associated with a subscriber account (block 1210, the device profile management server sends a default profile to the VoIP device (block 1220).

If authentication information has not been received (block 1225), control then returns to block 1205 to check again for device profile request. If authentication information has been received (block 1225), the device profile management server determines if a received authentication credential matches the authentication credential of a subscriber account (block 1230). If the authentication credential matches a subscriber account (block 1230), the device profile management server associates the VoIP device with the subscriber account (block 1235) and sends an authentication success acknowledgement via the VoIP device (block 1240). If the authentication credentials do not match a subscriber account (block 1230), the device profile management server sends an authentication failed response via the VoIP device (block 1245). Control then returns to block 1205 to check again for device profile request.

The example machine accessible instructions of FIG. 13 begin with a device authentication server (e.g., the example device authentication server 170) checking if authentication information has been received via a web interface (e.g., the example web server 510 of FIG. 5A) (block 1305). If authentication information has been received via a web interface (block 1305), the device authentication server attempts to authenticate the VoIP device by, for example, executing the example machine accessible instructions of FIG. 14. The device authentication server then provides and/or displays the authentication result (block 1310).

If authentication information has not been received via a string of dialed digits (e.g., an activation code) (block 1320), control returns to block 1305 to check for receipt of authentication information. If authentication information has been received via a string of dialed digits (block 1320), the device authentication server attempts to authenticate the VoIP device by, for example, executing the example machine accessible instructions of FIG. 14. The dialed digits may have been dialed by the user (e.g., the example of FIG. 8) and/or in response to an IVRS (e.g., the example of FIG. 9). The device authentication server then provides an audible authentication result indication (block 1325).

The example machine accessible instructions of FIG. 14 begin, for example, when called by the example machine accessible instructions of FIG. 13 at block 1310 or block 1325. The device authentication server compares the received authentication credential to the authentication credentials of subscriber accounts (block 1405). If a match is identified (block 1410), the example machine accessible instructions of FIG. 14 returns with a successful return value to, for example, the example machine accessible instructions of FIG. 13. If a match is not identified (block 1410), the example machine accessible instructions of FIG. 14 returns with a fail return value to, for example, the example machine accessible instructions of FIG. 13.

Figure 15:
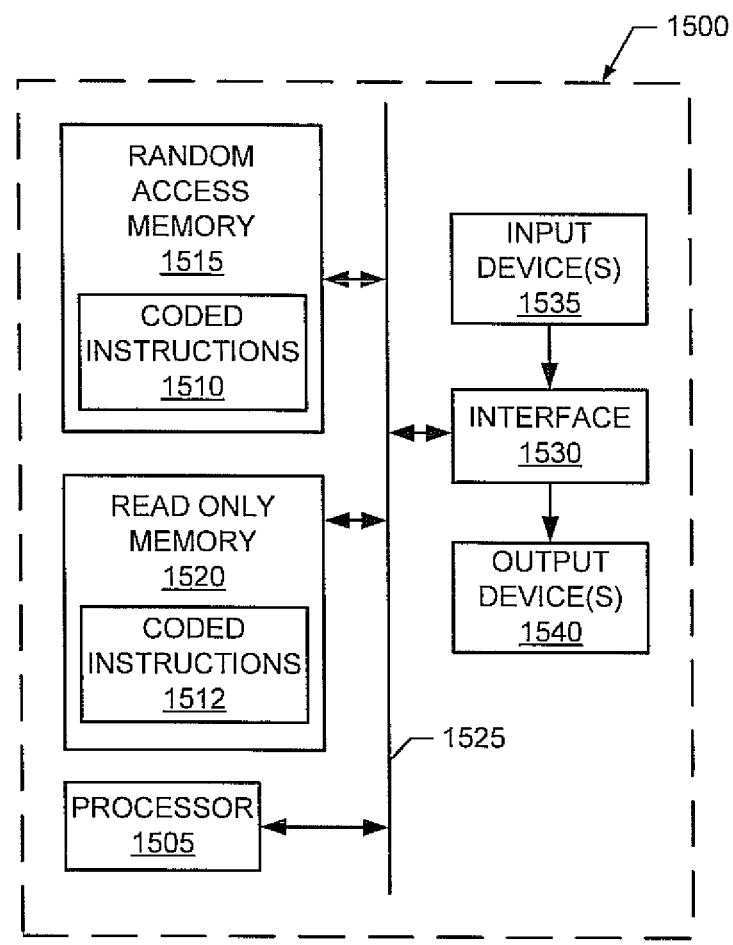
FIG. 15 is a schematic illustration of an example processor platform that may be used and/or programmed to execute the example machine readable instructions represented by FIGS. 10, 11, 12, 13 and/or 14 to implement the example VoIP devices, the example device profile management server and/or the example device authentication servers described herein.

FIG. 15 is a schematic diagram of an example processor platform 1500 that may be used and/or programmed to implement the example device profile management server 165, the example device authentication server 170, the example profile manager 315, the example web server 510 and/or the example IVRS 530. For example, the processor platform 1500 can be implemented by one or more general purpose processors, processor cores, microcontrollers, etc.

The processor platform 1500 of the example of FIG. 15 includes at least one general purpose programmable processor 1505. The processor 1505 executes coded instructions 1510 and/or 1512 present in main memory of the processor 1505 (e.g., within a RAM 1515 and/or a ROM 1520). The processor 1505 may be any type of processing unit, such as a processor core, a processor and/or a microcontroller. The processor 1505 may execute, among other things, the example machine accessible instructions of FIGS. 10, 11, 12, 13 and/or 14. The processor 1505 is in communication with the main memory (including a ROM 1520 and the RAM 1515) via a bus 1525. The RAM 1515 may be implemented by DRAM, SDRAM, and/or any other type of RAM device, and ROM may be implemented by flash memory and/or any other desired type of memory device. Access to the memory 1515 and 1520 maybe controlled by a memory controller (not shown). The RAM 1515 may be used to store and/or implement, for example, the example subscriber database 305 of FIG. 3 and/or the subscriber account data structure of FIG. 4.

The processor platform 1500 also includes an interface circuit 1530. The interface circuit 1530 may be implemented by any type of interface standard, such as an external memory interface, serial port, general purpose input/output, etc. One or more input devices 1535 and one or more output devices 1540 are connected to the interface circuit 1530. The input devices 1535 and/or output devices 1540 may be used to, for example, the network interfaces 325, 520 and 540.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories. The example software and/or firmware implementations described herein are optionally stored on a storage medium, such as a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A voice over Internet protocol system comprising:
a machine readable memory device including machine readable instructions;
an authentication server; and
a device profile management server including a processor to execute the instructions to perform operations including:
accessing a device identifier received from a voice over Internet protocol device;
providing a default device profile to the voice over Internet protocol device when the device identifier is not associated with a subscriber account, the default device profile not being associated with the subscriber account, the default device profile to cause a call processor with which the voice over Internet protocol device subsequently registers to:
determine whether a first telephone number of a call from the voice over Internet protocol device is an emergency call number associated with a 911 call; and
connect the call to one of a destination associated with the first telephone number or the authentication server depending on whether the first telephone number is the emergency call number, wherein the authentication server is not the destination associated with the first telephone number, the default device profile to cause the call processor to connect the call to the destination associated with the first telephone number in response to determining the first telephone number is the emergency call number, the default device profile to cause the call processor to automatically redirect the call to connect to the authentication server instead of the destination associated with the first telephone number in response to determining the first telephone number is not the emergency call number, the redirecting of the call to the authentication server to cause the voice over Internet protocol device to access the authentication server to become associated with the subscriber account; and
comparing an activation code received from the voice over Internet protocol device to a plurality of activation codes associated with a plurality of existing subscriber accounts to determine whether to associate the voice over Internet protocol device with the subscriber account.

2. The voice over Internet protocol system of claim 1, wherein the device profile management server includes the authentication server.

3. The voice over Internet protocol system of claim 1, wherein the call processor is a default call processor, and the operations further include sending a subscriber device profile when the device identifier is associated with the subscriber account, the subscriber device profile including a network address of a serving call processor.

4. The voice over Internet protocol system of claim 1, wherein the voice over Internet protocol device is at least one of a voice over Internet protocol phone, a voice over Internet protocol residential gateway, a personal computer, a voice over Internet protocol endpoint and a voice over Internet protocol adapter.

5. The voice over Internet protocol system of claim 1, wherein the operations further include:
storing information associated with the subscriber account.

6. The voice over Internet protocol system of claim 1, wherein the device profile management server includes an interactive voice response system.

7. The voice over Internet protocol system of claim 1, further including a voice over Internet protocol call processor to register the voice over Internet protocol device for a voice over Internet protocol service when the voice over Internet protocol device is authenticated.

8. The voice over Internet protocol system of claim 1, wherein the activation code is received from the voice over Internet protocol device via the authentication server.

9. A method to provision a voice over Internet protocol device, the method comprising:
accessing an authentication credential and a device identifier associated with a voice over Internet protocol device at a device profile management server, the device profile management server to provision the voice over Internet protocol device;
sending to the voice over Internet protocol device a default device profile when the device identifier is not associated with a subscriber account, the default device profile not being associated with the subscriber account, the default device profile to cause a call processor with which the voice over Internet protocol device subsequently registers to:
determine whether a first telephone number of a call from the voice over Internet protocol device is an emergency call number associated with a 911 call; and
connect the call to one of a destination associated with the first telephone number or an authentication server depending on whether the first telephone number is the emergency call number, wherein the authentication server is not the destination associated with the first telephone number, the default device profile to cause the call processor to route the call to the destination associated with the first telephone number in response to determining the first telephone number is the emergency call number, the default device profile to cause the call processor to automatically redirect the call to connect to the authentication server instead of the destination associated with the first telephone number in response to determining the first telephone number is not the emergency call number, the redirecting of the call to the authentication server to cause the voice over Internet protocol device to access the authentication server to become associated with the subscriber account; and
comparing an activation code received from the voice over Internet protocol device to a plurality of activation codes associated with a plurality of existing subscriber accounts to determine whether to associate the voice over Internet protocol device with the subscriber account.

10. The method of claim 9, further including sending a subscriber device profile associated with the subscriber account when the subscriber account is associated with the device identifier based on the authentication credential.

11. The method of claim 9, wherein the accessing of the authentication credential includes:

prompting for the authentication credential; and
receiving the authentication credential via an input device associated with the voice over Internet protocol device.

12. The method of claim 9, wherein the authentication credential is received by detecting a dialed digit.

13. The method of claim 9, wherein the authentication credential represents at least one of a username, a password, or the activation code.

14. The method of claim 9, wherein the accessing of the authentication credential and the device identifier associated with the voice over Internet protocol device at the device profile management server includes receiving at least one of a packet, a dialed digit, and a dual-tone multi-frequency signal at the device profile management server.

15. The method of claim 9, wherein the accessing of the authentication credential at the device profile management server includes receiving the authentication credential via the authentication server.

16. The method of claim 9, wherein the voice over Internet protocol device is at least one of a voice over Internet protocol phone, a voice over Internet protocol residential gateway, a personal computer, a voice over Internet protocol endpoint and a voice over Internet protocol adapter.

17. A voice over Internet protocol device comprising:
a machine readable memory device including machine readable instructions;
an input device to receive an authentication credential from a user of the voice over Internet protocol device; and
a processor to execute the instructions to perform operations including:
sending the authentication credential and a device identifier to a device profile management server to provision the voice over Internet protocol device, the authentication credential including an activation code to be compared to a plurality of activation codes associated with a plurality of existing subscriber accounts; and
receiving from the device profile management server a default device profile when the device identifier is not associated with a subscriber account, the default device profile not being associated with the subscriber account, the default device profile to cause a call processor with which the voice over Internet protocol device subsequently registers to:
determine whether a first telephone number of a call from the voice over Internet protocol device is an emergency call number associated with a 911 call;
connect the call to a destination associated with the first telephone number in response to determining the first telephone number is the emergency call number; and
automatically redirect the call to connect the call to an authentication server instead of the destination associated with the first telephone number in response to determining the first telephone number is not the emergency call number, the redirecting of the call to the authentication server to cause the voice over Internet protocol device to access the authentication server to become associated with the subscriber account.

18. The voice over Internet protocol device of claim 17, wherein the operations further include storing the device profile received from the device profile management server in response to sending the device identifier and the authentication credential.

19. The voice over Internet protocol device of claim 17, wherein the operations further include prompting a user for the authentication credential.

20. The voice over Internet protocol device of claim 17, wherein the operations further include sending the authentication credential via the authentication server.

21. The voice over Internet protocol device of claim 17, wherein the voice over Internet protocol device is at least one of a voice over Internet protocol phone, a voice over Internet protocol residential gateway, a personal computer, a voice over Internet protocol endpoint and a voice over Internet protocol adapter.

22. A machine readable memory device including machine accessible instructions which, when executed, cause a machine to perform operations comprising:
accessing an authentication credential and a device identifier associated with a voice over Internet protocol device at a device profile management server, the device profile management server to provision the voice over Internet protocol device;
sending to the voice over Internet protocol device a default device profile when the device identifier is not associated with a subscriber account, the default device profile not being associated with the subscriber account, the default device profile to cause a call processor with which the voice over Internet protocol device subsequently registers to:
determine whether a first telephone number of a call from the voice over Internet protocol device is an emergency call number associated with a 911 call; and
connect the call to one of a destination associated with the first telephone number or an authentication server depending on whether the first telephone number is the emergency call number, wherein the authentication server is not the destination associated with the first telephone number, the default device profile to cause the call processor to route the call to the destination associated with the first telephone number in response to determining the first telephone number is the emergency call, the default device profile to cause the call processor to automatically redirect the call to connect to the authentication server instead of the destination associated with the first telephone number in response to determining the first telephone number is not the emergency call number, the redirecting of the call to the authentication server to cause the voice over Internet protocol device to access the authentication server to become associated with the subscriber account; and
comparing an activation code received from the voice over Internet protocol device to a plurality of activation codes associated with a plurality of existing subscriber accounts to determine whether to associate the voice over Internet protocol device with the subscriber account.

23. The machine readable memory device of claim 22, wherein the operations further include sending a subscriber device profile associated with a subscriber account when the subscriber account is associated with the device identifier based on the authentication credential.

24. The machine readable memory device of claim 22, wherein the operations further include accessing the authentication credential by:
prompting for the authentication credential; and
receiving the authentication credential via an input device associated with the voice over Internet protocol device.

25. The machine readable memory device of claim 22, wherein the authentication credential is received by detecting a dialed digit.

26. The machine readable memory device of claim 22, wherein the authentication credential represents at least one of a username, a password, and the activation code.

27. The machine readable memory device of claim 22, wherein the operations further include accessing the authentication credential and the device identifier associated with the voice over Internet protocol device at the device profile management server by receiving at least one of a packet, a dialed digit, and a dual-tone multi-frequency signal at the device profile management server.

28. The machine readable memory device of claim 22, wherein the operations further include accessing the authentication credential at the device profile management server by receiving the authentication credential via the authentication server.

* * * * *